United States Patent
Ushigome et al.

(10) Patent No.: US 11,186,017 B2
(45) Date of Patent: Nov. 30, 2021

(54) EXPANSION DEVICE, THREE-DIMENSIONAL IMAGE FORMING SYSTEM, EXPANSION METHOD OF THERMALLY-EXPANDABLE SHEET, AND RECORDING MEDIUM

(71) Applicant: CASIO COMPUTER CO., LTD., Shibuya (JP)

(72) Inventors: Youichi Ushigome, Akishima (JP); Minoru Saito, Tendou (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 602 days.

(21) Appl. No.: 16/002,344

(22) Filed: Jun. 7, 2018

(65) Prior Publication Data

US 2018/0361634 A1    Dec. 20, 2018

(30) Foreign Application Priority Data

Jun. 20, 2017    (JP) .............................. JP2017-120267

(51) Int. Cl.
*B29C 44/34* (2006.01)
*B41M 5/00* (2006.01)
(Continued)

(52) U.S. Cl.
CPC ........ *B29C 44/3415* (2013.01); *B29C 44/022* (2013.01); *B29C 44/60* (2013.01);
(Continued)

(58) Field of Classification Search
None
See application file for complete search history.

(56) References Cited

U.S. PATENT DOCUMENTS 3,187,162 A    6/1965    Toku et al.
6,620,495 B1   9/2003    Kobayashi et al.
(Continued)

FOREIGN PATENT DOCUMENTS

CN    104540675 A    4/2015
JP    56155786 A    12/1981
(Continued)

OTHER PUBLICATIONS

English Translation of JP 2015230838 (Year: 2015).*
Office Action (Final Rejection) dated Aug. 12, 2020 issued in related U.S. Appl. No. 15/889,832.

*Primary Examiner* — Timothy Kennedy
*Assistant Examiner* — Olukorede Esan
(74) *Attorney, Agent, or Firm* — Holtz, Holtz & Volek PC

(57) ABSTRACT

An expansion device includes: an irradiation unit configured to irradiate a thermally-expandable sheet with light; a movement unit configured to relatively move the thermally-expandable sheet and the irradiation unit; an air-blowing unit configured to cool the irradiation unit by blowing air to the irradiation unit; and a control unit configured to execute a distension process of distending the thermally-expandable sheet by causing the irradiation unit to emit light while relatively moving the thermally-expandable sheet and the irradiation unit by the movement unit, wherein the control unit controls the air-blowing unit to stop or weaken blowing air toward the irradiation unit while the irradiation unit is caused to emit light in the distension process.

18 Claims, 13 Drawing Sheets

(51) Int. Cl.
   *B41M 7/00* (2006.01)
   *B29C 44/60* (2006.01)
   *B29C 44/02* (2006.01)
   *B29C 35/08* (2006.01)

(52) U.S. Cl.
   CPC ........ *B41M 5/0047* (2013.01); *B41M 5/0064* (2013.01); *B41M 7/0081* (2013.01); *B29C 35/0805* (2013.01); *B29C 2035/0822* (2013.01); *B29C 2795/002* (2013.01)

(56) References Cited

U.S. PATENT DOCUMENTS

| | | | |
|---|---|---|---|
| 9,731,494 B2 | 8/2017 | Yamasaki | |
| 10,016,965 B2 | 7/2018 | Sugimoto | |
| 2003/0235635 A1 | 12/2003 | Fong et al. | |
| 2007/0187612 A1* | 8/2007 | Inoue | B29C 65/1467 250/372 |
| 2013/0280498 A1 | 10/2013 | Horiuchi et al. | |
| 2015/0246518 A1 | 9/2015 | Sugimoto | |
| 2015/0375546 A1 | 12/2015 | Yamasaki | |
| 2016/0075083 A1* | 3/2016 | Motoyanagi | B29C 64/264 264/41 |
| 2018/0272578 A1 | 9/2018 | Ushigome et al. | |
| 2018/0272777 A1 | 9/2018 | Ushigome et al. | |

FOREIGN PATENT DOCUMENTS

| | | | |
|---|---|---|---|
| JP | S61072589 A | 4/1986 | |
| JP | S6428660 A | 1/1989 | |
| JP | 04166331 A | 6/1992 | |
| JP | 07246767 A | 9/1995 | |
| JP | H08118780 A | 5/1996 | |
| JP | H09175099 A | 7/1997 | |
| JP | 2001150812 A | 6/2001 | |
| JP | 2001225543 A | 8/2001 | |
| JP | 2013129144 A | 7/2013 | |
| JP | 2015230838 | * 12/2015 | ............... B08B 7/00 |
| JP | 2015230838 A | 12/2015 | |
| JP | 2016010955 A | 1/2016 | |

* cited by examiner

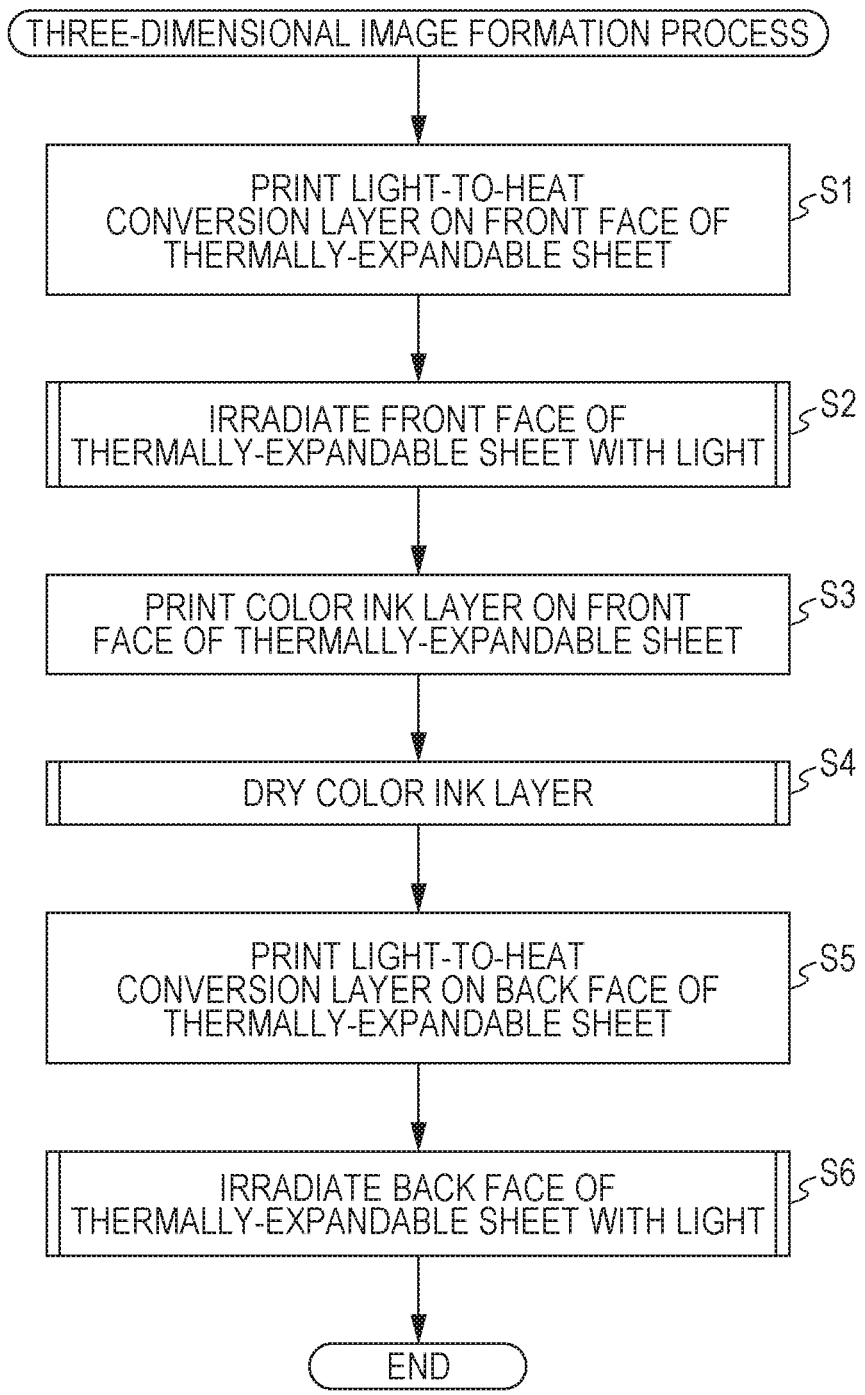

EXPANSION DEVICE, THREE-DIMENSIONAL IMAGE FORMING SYSTEM, EXPANSION METHOD OF THERMALLY-EXPANDABLE SHEET, AND RECORDING MEDIUM

BACKGROUND OF THE INVENTION

1. Field of the Invention

The present invention relates to an expansion device, a three-dimensional image forming system, an expansion method of a thermally-expandable sheet, and a recording medium.

2. Description of the Related Art

Techniques for forming a three-dimensional image have been known. For example, JP S64-28660 A and JP 2001-150812 A disclose methods for forming a three-dimensional image using a thermally-expandable sheet. Specifically, a pattern is formed using a material having excellent light absorption properties on a back face of the thermally-expandable sheet, and the formed pattern is heated by irradiating the pattern with light using an irradiation unit in the methods disclosed in JP 64-28660 A and JP 2001-150812 A. Accordingly, a portion of the thermally-expandable sheet on which the pattern has been formed distends and swells to form a three-dimensional image.

When the irradiation unit emits light, the temperature of the irradiation unit increases. Thus, there is a case where the irradiation unit is cooled by blowing air to the irradiation unit in order to adjust the temperature of the irradiation unit. In the case of blowing air to the irradiation unit, a manner in which the thermally-expandable sheet is heated is changed by the flow of air due to the air-blowing if the irradiation of light using the irradiation unit and the air-blowing of air to the irradiation unit are simultaneously performed, so that there is a problem that it is difficult for the thermally-expandable sheet to suitably distend.

The invention has been made in order to solve the above problem, and an object thereof is to provide an expansion device, a three-dimensional image forming system, an expansion method of a thermally-expandable sheet, and a recording medium capable of appropriately distending a thermally-expandable sheet.

SUMMARY OF THE INVENTION

An expansion device includes: an irradiation unit configured to irradiate a thermally-expandable sheet with light; a movement unit configured to relatively move the thermally-expandable sheet and the irradiation unit; an air-blowing unit configured to cool the irradiation unit by blowing air to the irradiation unit; and a control unit configured to execute a distension process of distending the thermally-expandable sheet by causing the irradiation unit to emit light while relatively moving the thermally-expandable sheet and the irradiation unit by the movement unit, wherein the control unit controls the air-blowing unit to stop or weaken blowing air toward the irradiation unit while the irradiation unit is caused to emit light in the distension process.
[Effect of the Invention]

BRIEF DESCRIPTION OF DRAWINGS

FIG. 10 is a flowchart illustrating a flow of a three-dimensional image formation process according to the embodiment of the invention;

DETAILED DESCRIPTION

Figure 1:
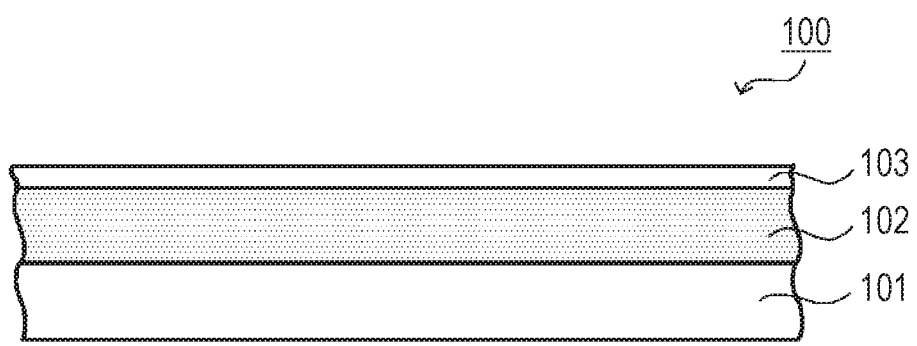
FIG. 1 is a cross-sectional view of a thermally-expandable sheet according to an embodiment of the invention.

Hereinafter, embodiments of the invention will be described with reference to the drawings. In the drawings, the same or corresponding parts will be denoted by the same reference numerals.

In the present embodiment, a shaped object is represented on a front face of a thermally-expandable sheet 100 by projections of a thermally-distensible layer 102. Further, the "shaped object" in the present specification includes a wide range of shapes such as simple shapes, geometric shapes, characters, and decorations. Here, the decorations mean shapes that recall an esthetic impression through a sense of sight and/or a sense of touch. Further, "modeling (or molding)" also includes concepts such as addition of decorations and formation of decorations without being limited to simple formation of the shaped object. Furthermore, a decorative shaped object indicates a shaped object which is formed as a result of the addition of decorations or the formation of decorations.

The shaped object according to the present embodiments uses as a reference a particular two-dimensional face (for example, an XY plane) within a three-dimensional space, and includes unevenness (for example, a Z axis) perpendicular to the face. Such shaped object is one example of three-dimensional (3D) images, but so as to distinguish from a three-dimensional image manufactured using a so-called 3D printing technique, the shaped object is called a 2.5-dimensional (2.5D) image or a pseudo-three-dimensional (preudo-3D) image. Furthermore, the technique for manufacturing the shaped object is one example of three-dimensional image printing techniques, but so as to distinguish from a so-called 3D printer, the technique is called a 2.5-dimensional (2.5D) printing technique or a pseudo-three-dimensional (pseudo-3D) printing technique.

<Thermally-Expandable Sheet 100>

FIG. 1 illustrates a configuration of the thermally-expandable sheet 100 configured to form a three-dimensional image by a three-dimensional image forming system 1 according to the present embodiment. The thermally-expandable sheet 100 is a medium on which a three-dimensional image is formed by distending a portion that has been selected in advance by heating. The three-dimensional image is a three-dimensional image formed as a part of a sheet is distended in a direction perpendicular to the sheet in the two-dimensional sheet.

As illustrated in FIG. 1, the thermally-expandable sheet 100 includes a base member 101, the thermally-distensible layer 102, and an ink-receiving layer 103 in this order. Incidentally, FIG. 1 illustrates a cross section of the thermally-expandable sheet 100 before a three-dimensional image is formed, that is, a state where no part is distended.

The base member 101 is a sheet-like medium that serves as a base of the thermally-expandable sheet 100. The base member 101 is a support that supports the thermally-distensible layer 102 and the ink-receiving layer 103, and plays a role of maintaining the strength of the thermally-expandable sheet 100. For example, general printing paper can be used as the base member 101. Alternatively, a material of the base member 101 may be a plastic film such as synthetic paper, cloth such as canvas, polypropylene, polyethylene terephthalate (PET), and polybutylene terephthalate (PBT), and is not particularly limited.

The thermally-distensible layer 102 is a layer that is stacked on the upper side of the base member 101 and distends when heated to a temperature to a prescribed temperature or higher. The thermally-distensible layer 102 contains a binder and thermal-expandable agents dispersed in the binder. The binder is a thermoplastic resin such as a vinyl acetate type polymer and an acryl type polymer. The thermal-expandable agent is a thermally-expandable microcapsule having a particle size of about 5 to 50 μm obtained by encapsulating a substance to be vaporized at a low boiling point such as propane and butane in a shell of a thermoplastic resin. When the thermal-expandable agent is heated to a temperature of, for example, 80° C. to 120° C., the encapsulated substance is vaporized to foam and distend due to the pressure. In this manner, the thermally-distensible layer 102 distends depending on the amount of heat thus absorbed. The thermal-expandable agent is also referred to as a foaming agent.

The ink-receiving layer 103 is a layer that is stacked on the upper side of the thermally-distensible layer 102 and absorbs and receives the ink. The ink-receiving layer 103 receives a printing ink used in an ink jet printer, a printing toner used in a laser printer, an ink of a ball-point pen or a fountain pen ink, graphite of a pencil, and the like. The ink-receiving layer 103 is formed using a material suitable for fixing such inks on the front face. For example, a general-purpose material used for inkjet paper can be used as the material of the ink-receiving layer 103.

Figure 2:
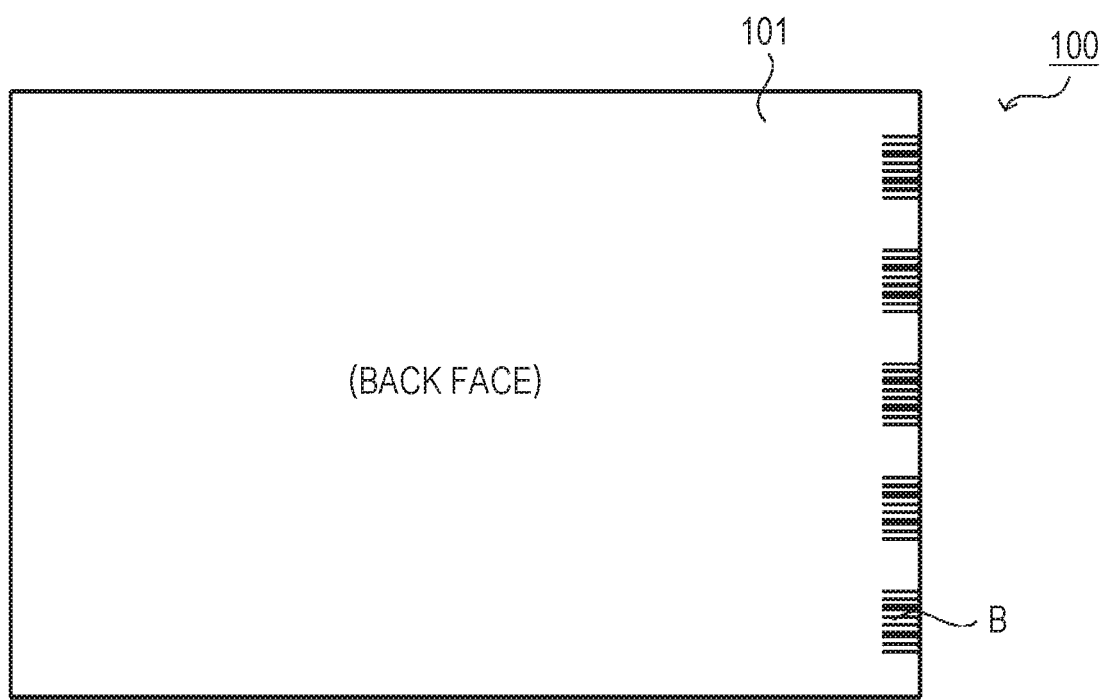
FIG. 2 is a view illustrating a back face of the thermally-expandable sheet illustrated in FIG. 1.

FIG. 2 illustrates a back face of the thermally-expandable sheet 100. The back face of the thermally-expandable sheet 100 is a face of the thermally-expandable sheet 100 on a side of the base member 101, and corresponds to a back face of the base member 101. On the other hand, the front face of the thermally-expandable sheet 100 is a face of the thermally-expandable sheet 100 on a side of the ink-receiving layer 103, and corresponds to a front face of the ink-receiving layer 103.

As illustrated in FIG. 2, a plurality of barcodes B are attached to the back face of the thermally-expandable sheet 100 along an edge portion thereof. The barcode B is an identifier configured to identify the thermally-expandable sheet 100, and is information indicating that the thermally-expandable sheet 100 is a dedicated sheet to form a three-dimensional image. The barcode B is read by an expansion device 50 of the three-dimensional image forming system 1 to be described later and is an identifier configured to determine whether to use the thermally-expandable sheet 100 in the expansion device 50.

<Three-Dimensional Image Forming System 1>

Figure 3:
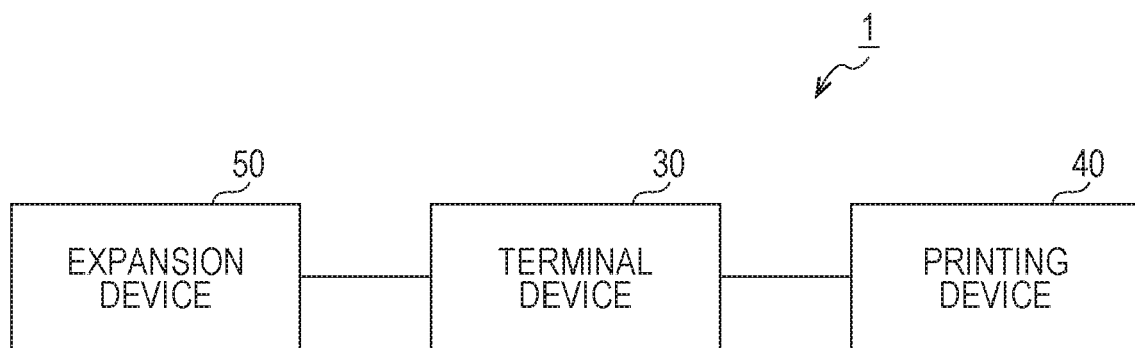
FIG. 3 is a diagram illustrating a schematic configuration of a three-dimensional image forming system according to an embodiment of the invention.

Next, the three-dimensional image forming system 1 configured to form a three-dimensional image on the thermally-expandable sheet 100 will be described with reference to FIG. 3. As illustrated in FIG. 3, the three-dimensional image forming system 1 includes a terminal device 30, a printing device 40, and the expansion device 50.

Figure 4:
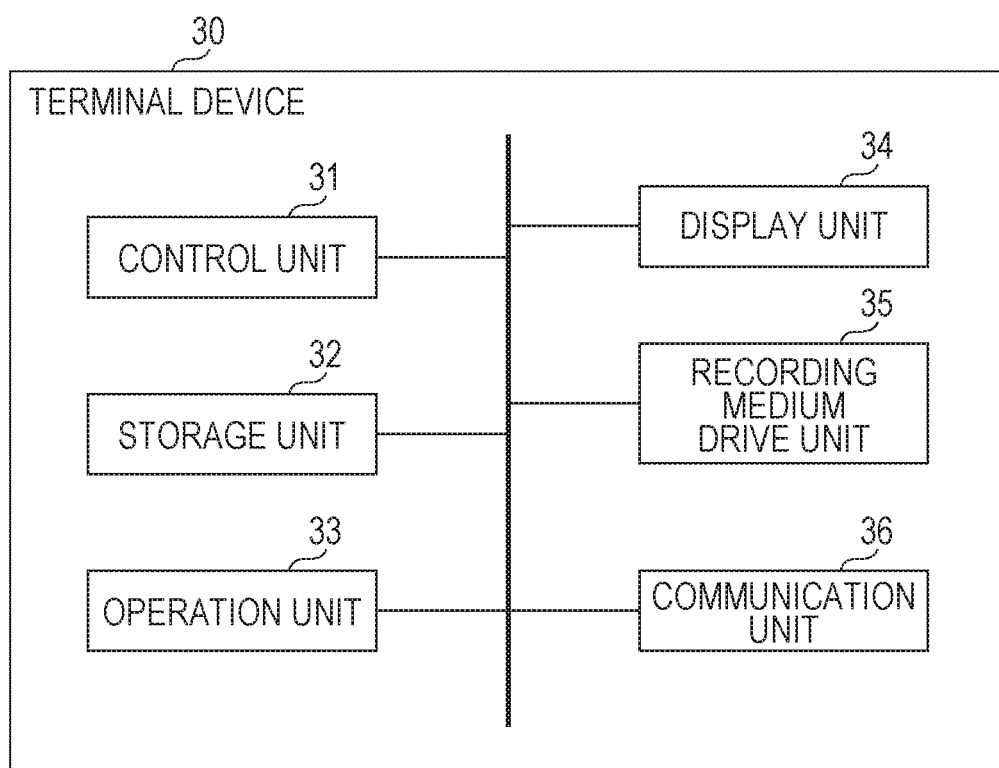
FIG. 4 is a block diagram illustrating a configuration of a terminal device according to an embodiment of the invention.

The terminal device 30 is an information processing device such as a personal computer, a smartphone, and a tablet, and is a control unit that controls the printing device 40 and the expansion device 50. As illustrated in FIG. 4, the terminal device 30 includes a control unit (a processor) 31, a storage unit 32, an operation unit 33, a display unit 34, a recording medium drive unit 35, and a communication unit 36. These units are connected via a bus configured to transmit a signal.

The control unit 31 includes a central processing unit (CPU), read only memory (ROM), and random access memory (RAM). In the control unit 31, the CPU reads a control program stored in the ROM and controls the entire operation of the terminal device 30 while using the RAM as a work memory.

The storage unit 32 is nonvolatile memory such as flash memory and a hard disk. The storage unit 32 stores a program or data executed by the control unit 31, and color image data, front face foaming data, and back face foaming data to be printed by the printing device 40.

The operation unit 33 includes an input device such as a keyboard, a mouse, a button, a touch pad, and a touch panel, and receives an operation from a user. The user can input an operation of editing the color image data, the front face foaming data, and the back face foaming data, an operation with respect to the printing device 40 or the expansion device 50, and the like by operating the operation unit 33.

The display unit 34 includes a display device such as a liquid crystal display and an organic EL (Electro Luminescence) display, and a display drive circuit that displays an image on the display device. For example, the display unit 34 displays the color image data, front face foaming data, and backside foaming data. Further, the display unit 34 displays information indicating a current state of the printing device 40 or the expansion device 50 as necessary.

The recording medium drive unit 35 reads a program or data recorded in a portable recording medium. The portable recording medium is a compact disc (CD)-ROM, a digital versatile disc (DVD)-ROM, flash memory provided with a universal serial bus (USB) standard connector, or the like.

For example, the recording medium drive unit 35 reads and acquires the color image data, the front face foaming data, and the back face foaming data from the portable recording medium.

The communication unit 36 includes an interface configured to communicate with external devices including the printing device 40 and the expansion device 50. The terminal device 30 is connected to the printing device 40 and the expansion device 50 in a wired manner via a flexible cable, a wired local area network (LAN), and the like or a wireless manner via a wireless LAN, Bluetooth (registered trademark), and the like. The communication unit 36 communicates with the printing device 40 and the expansion device 50 according to at least one of such communication standards under the control of the control unit 31.

<Printing Device 40>

The printing device 40 is a printing unit that prints an image on the front or back face of the thermally-expandable sheet 100. The printing device 40 is an inkjet printer that prints an image by a method of converting ink into fine droplets and blowing the ink droplets directly onto a printing medium.

Figure 5:
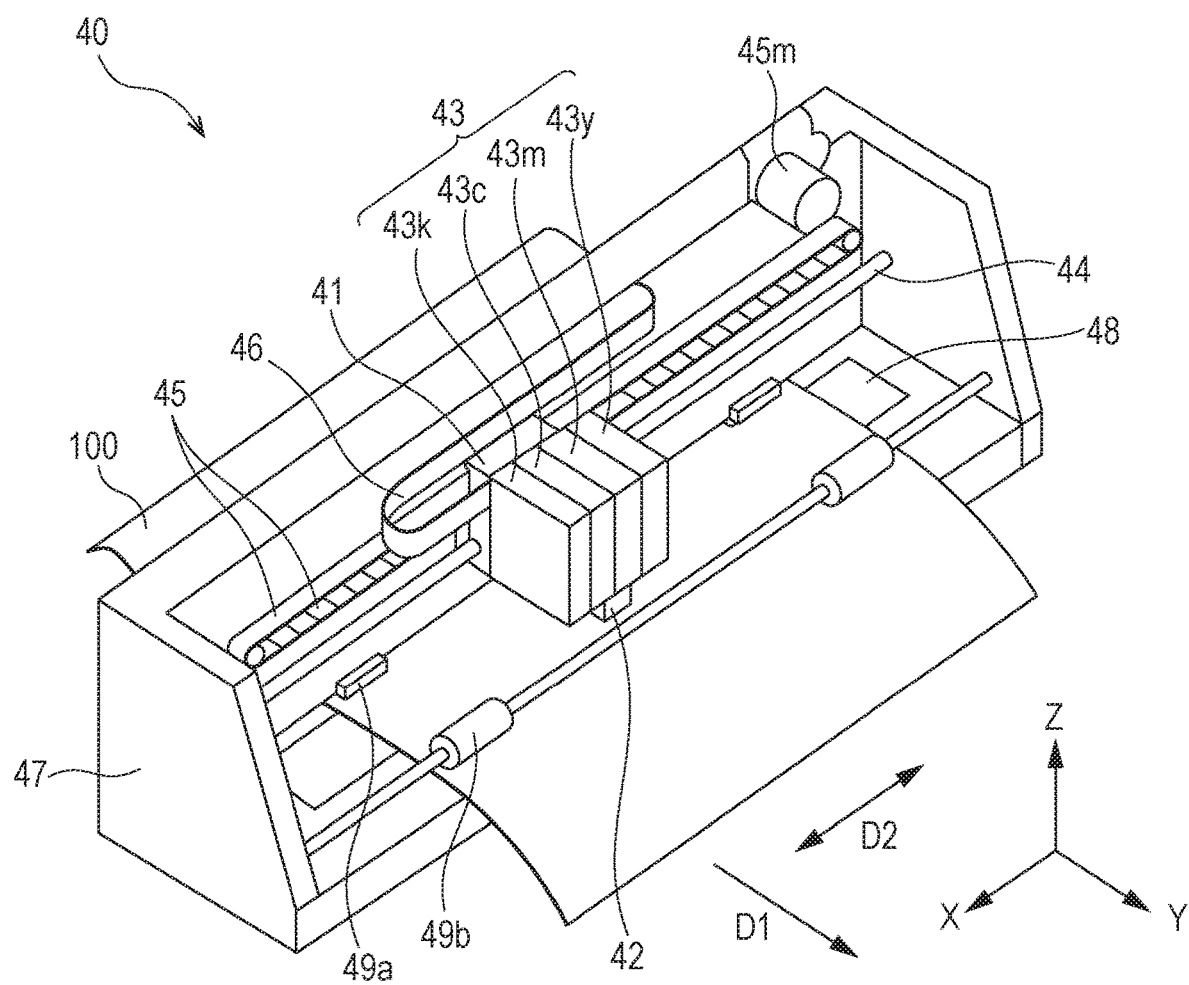
FIG. 5 is a perspective view illustrating a configuration of a printing device according to an embodiment of the invention.

FIG. 5 illustrates a detailed configuration of the printing device 40. As illustrated in FIG. 5, the printing device 40 includes a carriage 41 (not illustrated) capable of reciprocating in a main scanning direction D2 (X direction) orthogonal to a sub-scanning direction D1 (Y direction) in which the thermally-expandable sheet 100 is conveyed.

A print head 42 that performs printing and ink cartridges 43 (43k, 43c, 43m, and 43y) that contain inks are attached to the carriage 41. Color inks of black K, cyan C, magenta M, and yellow Y are contained in the ink cartridges 43k, 43c, 43m, and 43y, respectively. Each color ink is ejected from a corresponding nozzle of the print head 42.

The carriage 41 is slidably supported on a guide rail 44, and is clamped by a drive belt 45. When the drive belt 45 is driven by rotation of a motor 45m, the carriage 41 moves in the main scanning direction D2 together with the print head 42 and the ink cartridge 43.

A platen 48 is provided at a position opposing the print head 42 in a lower part of a frame 47. The platen 48 extends in the main scanning direction D2 and forms a part of a conveying path of the thermally-expandable sheet 100. A sheet-feeding roller pair 49a (a lower roller thereof is not illustrated) and a sheet-discharging roller pair 49b (a lower roller thereof is not illustrated) are provided in the conveying path of the thermally-expandable sheet 100. The sheet-feeding roller pair 49a and the sheet-discharging roller pair 49b convey the thermally-expandable sheet 100 supported by the platen 48 in the sub-scanning direction D1.

The printing device 40 is connected to the terminal device 30 via a flexible communication cable 46. The terminal device 30 controls the print head 42, the motor 45m, the sheet-feeding roller pair 49a, and the sheet-discharging roller pair 49b via the flexible communication cable 46. More specifically, the terminal device 30 controls the sheet-feeding roller pair 49a and the sheet-discharging roller pair 49b to convey the thermally-expandable sheet 100. Further, the terminal device 30 rotates the motor 45m to move the carriage 41 and to convey the print head 42 to an appropriate position in the main scanning direction D2.

The printing device 40 acquires image data from the terminal device 30 and executes printing based on the acquired image data. More specifically, the printing device 40 acquires the color image data, the front face foaming data, and the back face foaming data as the image data. The color image data is data indicating a color image to be printed on the front face of the thermally-expandable sheet 100. The printing device 40 causes the print head 42 to spray each ink of cyan C, magenta M, and yellow Y toward the thermally-expandable sheet 100 to print the color image.

On the other hand, the front face foaming data is data indicating a portion that is caused to foam and distend on the front face of the thermally-expandable sheet 100. Further, the back face foaming data is data indicating a portion that is caused to foam and distend on the back face of the thermally-expandable sheet 100. The printing device 40 causes the print head 42 to spray the black ink of black K containing carbon black toward the thermally-expandable sheet 100 to print a grayscale image (grayscale pattern) using the black color. The black ink containing carbon black is an example of a material that converts light into heat.

<Expansion Device 50>

The expansion device 50 is an expansion unit that irradiates the front or back face of the thermally-expandable sheet 100 with light, causes a gray image printed on the front or back face of the thermally-expandable sheet 100 to generate heat, and causes a portion of the thermally-expandable sheet 100 on which the grayscale image has been printed to be distended.

Figure 6:
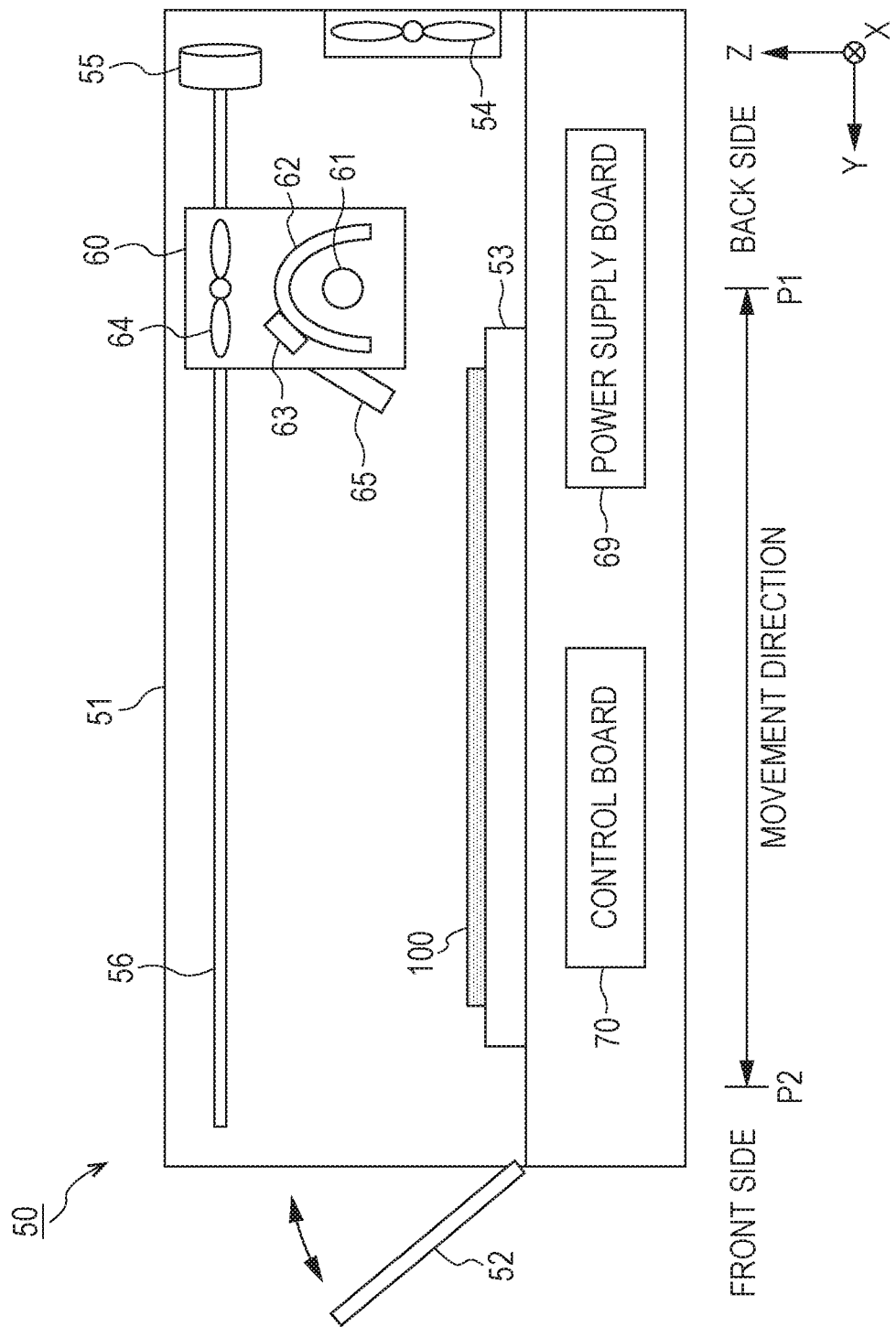
FIG. 6 is a cross-sectional view illustrating a configuration of an expansion device according to an embodiment of the invention.

FIG. 6 schematically illustrates a configuration of the expansion device 50. In FIG. 6, the X direction corresponds to the width direction of the expansion device 50, the Y direction corresponds to the longitudinal direction of the expansion device 50, and the Z direction corresponds to the vertical direction. The X direction, the Y direction, and the Z direction are orthogonal to each other. As illustrated in FIG. 6, the expansion device 50 includes a housing 51, an insertion section 52, a tray 53, a ventilation unit 54, a conveyance motor 55, a conveyance rail 56, an irradiator 60, a power supply board 69, and a control board 70.

The insertion section 52 is a mechanism that is provided with an openable and closable door and is configured to insert the thermally-expandable sheet 100, which is a target for forming a three-dimensional image, inside the housing 51. A user opens the insertion section 52, causes the tray 53 to slide and be pulled out to the near side, and then, places the thermally-expandable sheet 100 on the tray 53 with the front or back face thereof facing upward. At this time, the user places the thermally-expandable sheet 100 on the tray 53 such that an end portion of the thermally-expandable sheet 100 to which the barcode B is attached is positioned on the back side. When the tray 53 on which the thermally-expandable sheet 100 is placed is returned to the inside of the housing 51 and the insertion section 52 is closed, the thermally-expandable sheet 100 is arranged at a position that can be irradiated with light by the irradiator 60.

The tray 53 is a mechanism configured to place the thermally-expandable sheet 100 at an appropriate position in the housing 51. The tray 53 is fixed by pressing edges of four sides of the placed thermally-expandable sheet 100 from above. The tray 53 is provided with a sensor that detects the thermally-expandable sheet 100, and detects whether the thermally-expandable sheet 100 has been placed and a size of the thermally-expandable sheet 100 when the thermally-expandable sheet 100 has been placed.

The ventilation unit 54 is provided at an end portion on the back side in the expansion device 50 and functions as a ventilation unit that ventilates the inside of the expansion device 50. The ventilation unit 54 is provided with at least one fan, and ventilates the inside of the housing 51 by discharging the air inside the housing 51 to the outside. The air in the housing 51 is supplied from the outside by the air-blowing unit 64 and discharged to the outside by the ventilation unit 54. The ventilation unit 54 circulates the air inside the housing 51 by discharging the air supplied from the outside by the air-blowing unit 64 to the outside.

The conveyance motor 55 is, for example, a stepping motor that operates in synchronization with pulse power, and moves the irradiator 60 along the front or back face of the thermally-expandable sheet 100. The conveyance rail 56 is provided inside of the housing 51 in the Y direction, that is, in a direction parallel to the front or back face of the thermally-expandable sheet 100. The irradiator 60 is attached to the conveyance rail 56 so as to be movable along the conveyance rail 56. The irradiator 60 reciprocates along the conveyance rail 56 while keeping a constant distance from the thermally-expandable sheet 100 by using a driving force resulting from the rotation of the conveyance motor 55 as a power source. The conveyance motor 55 functions as a movement means for relatively moving the thermally-expandable sheet 100 and the irradiator 60.

More specifically, the irradiator 60 has a first position P1 corresponding to the end portion on the back side of the thermally-expandable sheet 100 and a second position P2 corresponding to an end portion on the front side of the thermally-expandable sheet 100. The conveyance motor 55 moves the irradiator 60 in a first direction from the first position P1 to the second position P2 and in a second direction from the second position P2 toward the first position P1. The first position P1 is an initial position (home position) of the irradiator 60. The irradiator 60 stands by at the first position P1 while the expansion device 50 does not operate.

The first position P1 is a position on the opposite side of a side where the insertion section 52 is provided in the housing 51, and the second position P2 is a position on a side where the insertion section 52 is provided in the housing 51. In other words, the first position P1 is a position that is farther from an end portion on a side of the expansion device 50 where the thermally-expandable sheet 100 is inserted than the second position P2. Since the initial position of the irradiator 60 is provided on the side opposite to the insertion section 52 in the housing 51 in this manner, it is possible to prevent the user from touching the irradiator 60 at the time of inserting the thermally-expandable sheet 100 into the housing 51. Thus, the user can smoothly place the thermally-expandable sheet 100.

The irradiator 60 is a mechanism that emits light, and irradiates the thermally-expandable sheet 100 arranged on the tray 53 with light. As illustrated in FIG. 6, the irradiator 60 includes a lamp heater 61, a reflection plate 62, a temperature sensor 63, an air-blowing unit 64, and a barcode reader 65.

The lamp heater 61 includes, for example, a halogen lamp and irradiates the thermally-expandable sheet 100 with light of a near-infrared region (having a wavelength of 750 to 1400 nm), a visible light region (having a wavelength of 380 to 750 nm), or a mid-infrared region (having a wavelength of 1400 to 4000 nm). The irradiator 60 and the lamp heater 61 function as irradiation unit for irradiating the thermally-expandable sheet 100 with light. When the thermally-expandable sheet 100 on which the gray image has been printed by the black ink containing carbon black is irradiated with light, the light is more efficiently converted to heat in a portion where the grayscale image has been printed than in a portion where the grayscale image has not been printed. Thus, the portion of the thermally-expandable sheet 100 where the grayscale image has been printed is mainly heated and distends when the thermal-expandable agent reaches a temperature at which distension starts.

The reflection plate 62 is a mechanism that is arranged so as to cover an upper side of the lamp heater 61 and reflects the light emitted from the lamp heater 61 toward the thermally-expandable sheet 100. The temperature sensor 63 is a thermocouple, a thermistor, or the like, and functions as a measurement means for measuring the temperature of the reflection plate 62.

The air-blowing unit 64 is provided above the reflection plate 62. That is, the air-blowing unit 64 is fixed above the lamp heater 61 via the reflection plate 62. The air-blowing unit 64 includes at least one fan and functions as an air-blowing means for cooling the irradiator 60 by blowing air to the irradiator 60. The air-blowing unit 64 is arranged such that an arrangement position with respect to the lamp heater 61 is fixed and the generated wind hits the lamp heater 61. More specifically, the air-blowing unit 64 sucks the air outside the expansion device 50 from an air supply port provided at the top of the air-blowing unit 64, and sends the sucked air to the irradiator 60. The air sucked by the air-blowing unit 64 is supplied to the reflection plate 62, and the reflection plate 62 is cooled by the air. Further, the air sucked by the air-blowing unit 64 is supplied to the inside of the expansion device 50 through the irradiator 60, and the respective units in the housing 51 including the thermally-expandable sheet 100 placed on the tray 53 are cooled.

The barcode reader 65 functions as a reading means for reading the barcode B attached to the back face of the thermally-expandable sheet 100. When the thermally-expandable sheet 100 is inserted into the expansion device 50 with the front face facing upward, the barcode reader 65 reads the barcode B attached to the back face of the thermally-expandable sheet 100 via a reflector (not illustrated). The reflector is a reflecting mirror that is installed at an end portion on the back side of the tray 53 and is configured to enable the barcode reader 65 to read the barcode B from the opposite side. On the other hand, when the thermally-expandable sheet 100 is inserted into the expansion device 50 with the back face thereof facing upward, the barcode reader 65 directly reads the barcode B attached to the back face of the thermally-expandable sheet 100 without passing through the reflector.

The expansion device 50 determines whether a medium installed on the tray 53 can be used in the expansion device 50 based on whether the barcode B has been read by the barcode reader 65. When the medium, which is not a dedicated sheet for forming a three-dimensional image, is inserted into the expansion device 50, there is a possibility that the expansion device 50 does not operate normally. Thus, when the barcode reader 65 has not read the barcode B, the expansion device 50 does not start a light irradiation process performed by the irradiator 60. Accordingly, a malfunction of the expansion device 50 is suppressed.

The power supply board 69 includes a power supply integrated circuit (IC) and the like, and generates and supplies necessary power to the respective units in the expansion device 50. For example, the ventilation unit 54, the conveyance motor 55, the lamp heater 61, and the air-blowing unit 64 operate by obtaining the power from the power supply board 69.

Figure 7:
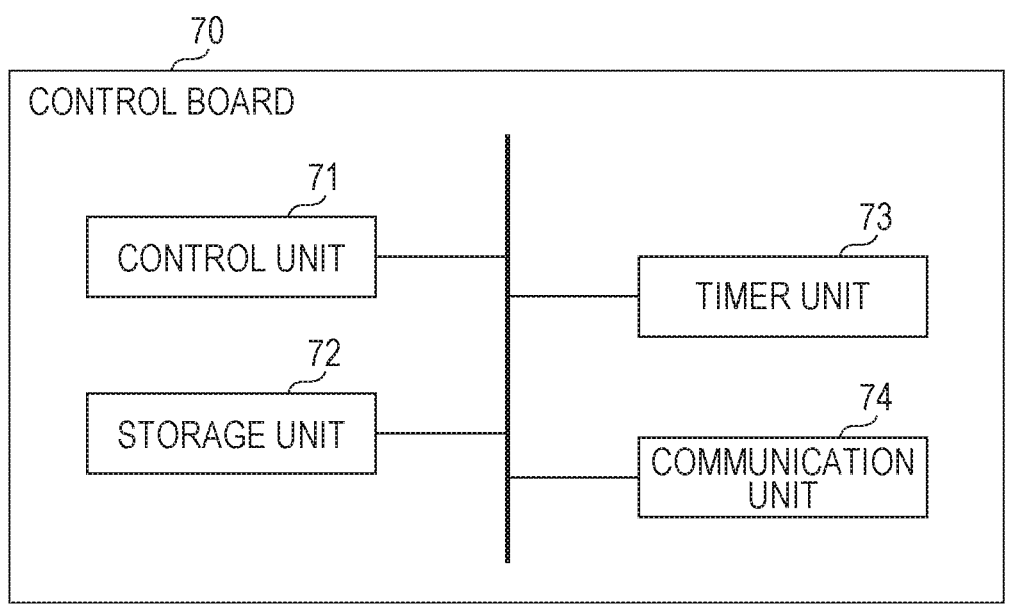
FIG. 7 is a block diagram illustrating a configuration of a control unit of the expansion device according to the embodiment of the invention.

The control board 70 is provided on a substrate arranged below the housing 51 and controls the operation of each unit of the expansion device 50. As illustrated in FIG. 7, the control board 70 includes a control unit 71, a storage unit 72, a timer unit 73, and a communication unit 74.

The control unit 71 includes a CPU, ROM, and RAM, and is connected to each unit of the expansion device 50 via a system bus that is a transmission path configured to transfer a command and data. The CPU is, for example, a microprocessor or the like, and is a central processing unit that executes various processes and operations. In the control unit 71, the CPU reads a control program stored in the ROM and controls the entire operation of the expansion device 50 while using the RAM as a work memory.

The storage unit 72 is nonvolatile memory such as flash memory and a hard disk. The storage unit 72 stores a program or data to be executed by the control unit 71 and data generated or acquired as the control unit 71 performs various processes. The timer unit 73 includes a timer device such as a real time clock (RTC), and keeps counting time even while the power of the expansion device 50 is off.

The communication unit 74 has an interface for communication with the terminal device 30. The communication unit 74 performs wired or wireless communication with the terminal device 30 under the control of the control unit 71. For example, the communication unit 74 acquires an instruction to start the light irradiation process, which has been input from the user in the terminal device 30, from the terminal device 30. Further, the communication unit 74 transmits information indicating a current state of the expansion device 50 to the terminal device 30.

The control unit 71 functions as a control means for controlling operations of the ventilation unit 54, the conveyance motor 55, the irradiator 60, and the air-blowing unit 64. More specifically, the control unit 71 performs a distension process of distending the thermally-expandable sheet 100, a cooling process of cooling the irradiator 60, a drying process of drying the thermally-expandable sheet 100, and a preheating process of preliminarily heating the thermally-expandable sheet 100. Hereinafter, the processes will be described in order.

<Distension Process>

The control unit 71 distends the thermally-expandable sheet 100 by irradiating the thermally-expandable sheet 100 in a state where the gray image containing carbon black has been printed on the front or back face thereof with light. More specifically, the control unit 71 distends the thermally-expandable sheet 100 by causing the irradiator 60 to emit light while moving the irradiator 60 in the first direction by the conveyance motor 55.

Figure 8:
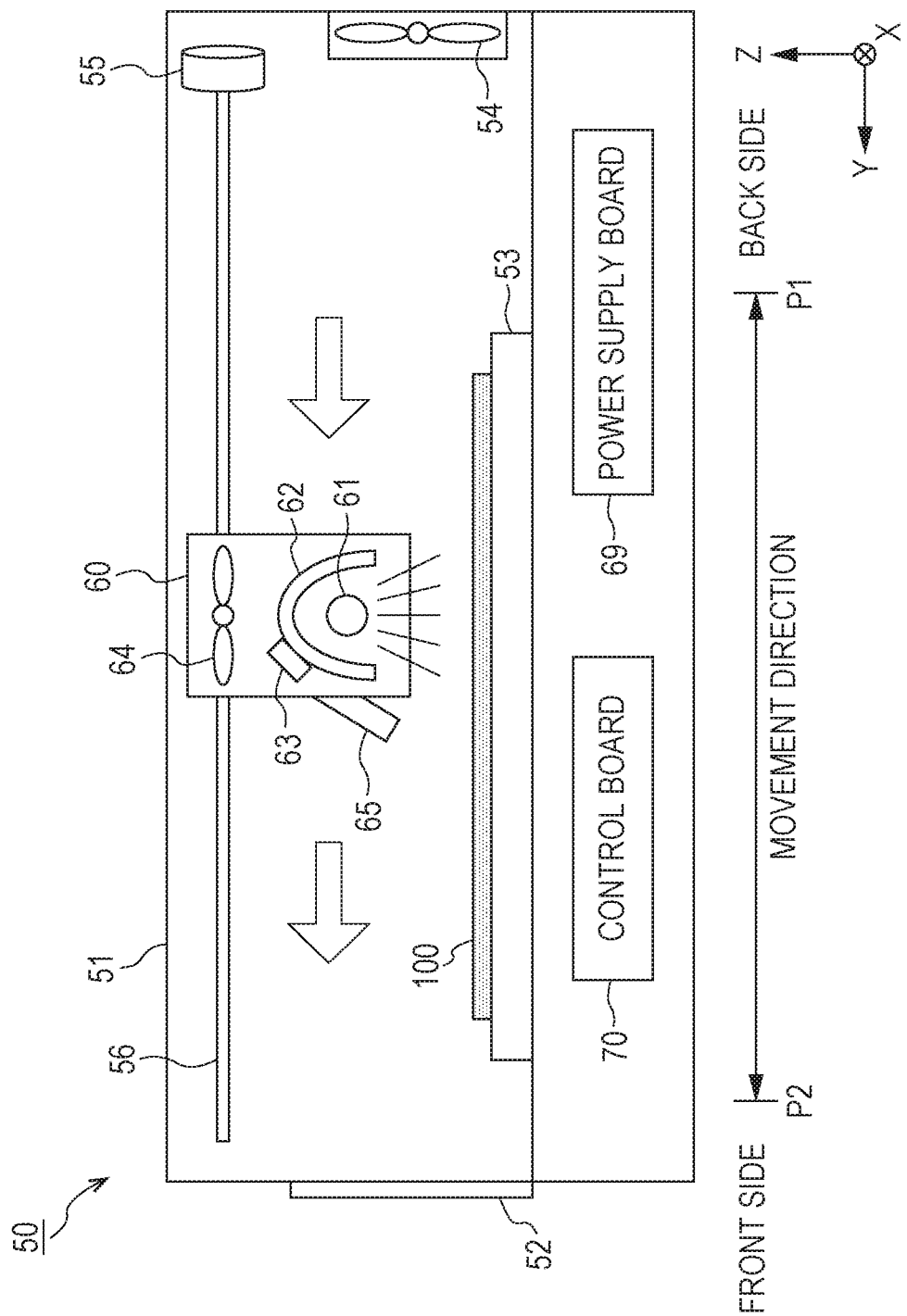
FIG. 8 is a diagram illustrating a state where the expansion device according to the embodiment of the invention executes a distension process.

FIG. 8 illustrates a state where the expansion device 50 executes the distension process. In the distension process, the control unit 71 supplies a power supply voltage to the irradiator 60 to turn on the lamp heater 61. Then, the control unit 71 drives the conveyance motor 55 in a state where the irradiator 60 is caused to emit light. Accordingly, the control unit 71 moves the irradiator 60 from the first position P1 toward the second position P2, that is, in the first direction by a prescribed distance. In this manner, the control unit 71 irradiates the entire front or back face of the thermally-expandable sheet 100 with light by moving the irradiator 60 from an end to an end of the thermally-expandable sheet 100.

The prescribed distance varies depending on a size of the thermally-expandable sheet 100. For example, if the size of the thermally-expandable sheet 100 is the A3-size, the prescribed distance is a distance from the first position P1 to the second position P2. Alternatively, if the size of the thermally-expandable sheet 100 is the A4-size, the prescribed distance is half the distance from the first position P1 to the second position P2.

When light is emitted by the irradiator 60, the portion of the thermally-expandable sheet 100 on which the grayscale image containing carbon black has been printed generates heat, and distends when heated to a prescribed temperature. The portion of the thermally-expandable sheet 100 on which the grayscale image has been printed distends to a height depending on the darkness of black in the grayscale image. As a result, a three-dimensional image is formed on the thermally-expandable sheet 100.

The prescribed temperature is a temperature at which the thermal-expandable agent contained in the thermally-distensible layer 102 starts to distend, and is, for example, a temperature of about 80° C. to 120° C. The control unit 71 moves the irradiator 60 that emits light with a predetermined intensity at predetermined speed to heat the portion of the thermally-expandable sheet 100 on which the gradation image has been printed to a temperature equal to or higher than the prescribed temperature. The predetermined intensity and the predetermined speed are set in advance such that the thermally-expandable sheet 100 can be heated to the temperature equal to or higher than the prescribed temperature.

In such a distension process, the control unit 71 controls the air-blowing unit 64 so as to stop blowing air while the irradiator 60 is caused to emit light. When the irradiation of light by the irradiator 60 and the air-blowing to the irradiator 60 are simultaneously performed, the heat of the lamp heater 61 is transmitted to the thermally-expandable sheet 100 by the flow of air due to the air-blowing. As a result, a manner in which the thermally-expandable sheet 100 is heated is not stabilized, and the quality of distension changes so that, for example, the thermally-expandable sheet 100 excessively bulges. In order to avoid the occurrence of such an abnormality, the control unit 71 causes the air-blowing unit 64 not to blow air while causing the irradiator 60 to emit light and causes the irradiator 60 not to emit light while causing the air-blowing unit 64 to blow air.

<Cooling Process>

After executing the distension process, the control unit 71 controls the irradiator 60 to stop irradiation of light, and then controls the air-blowing unit 64 to start blowing of air. Then, the control unit 71 executes the cooling process of cooling the irradiator 60 by causing the air-blowing unit 64 to blow air while moving the irradiator 60 in the second direction.

Figure 9:
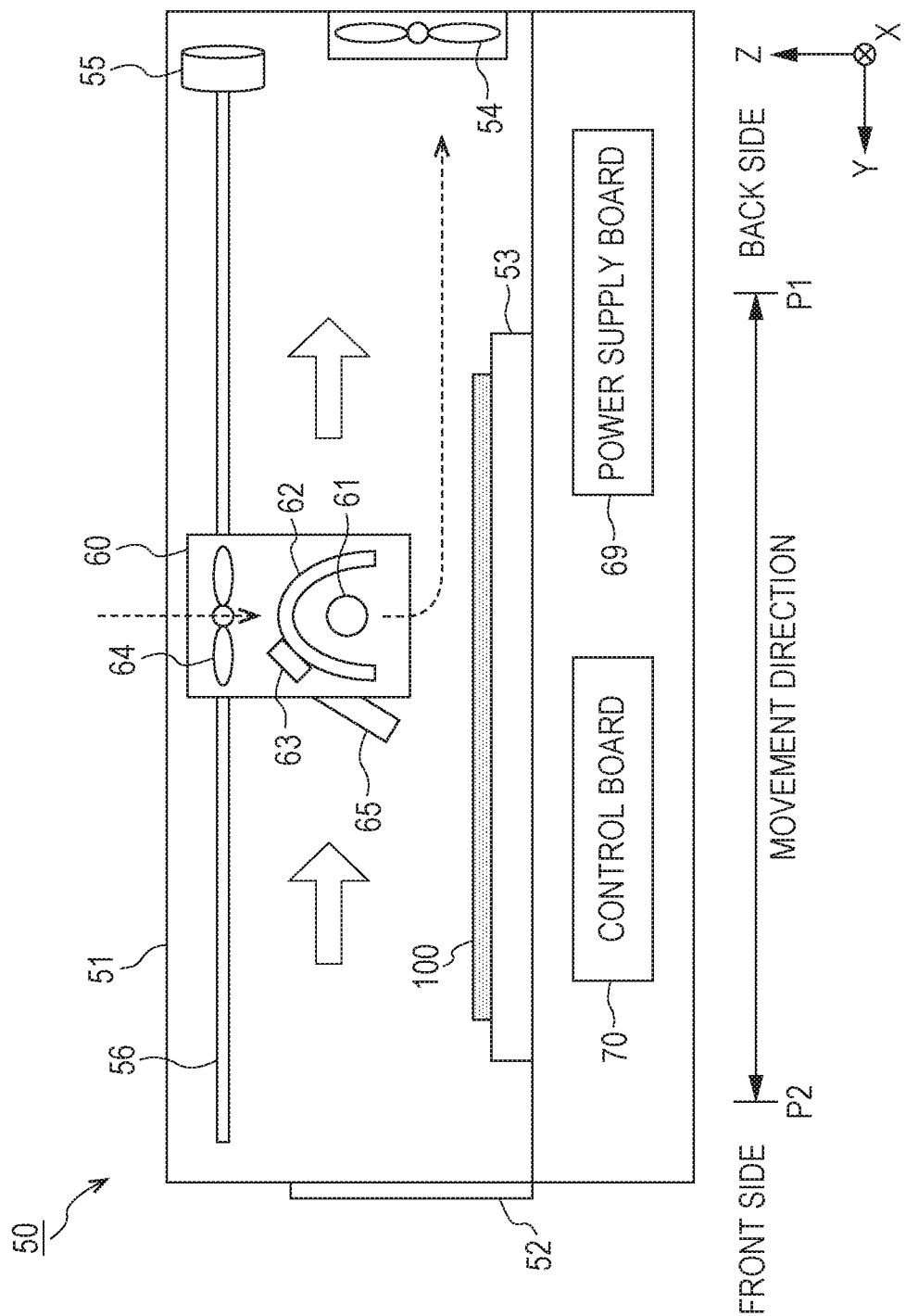
FIG. 9 is a diagram illustrating a state where the expansion device according to the embodiment of the invention executes a cooling process.

FIG. 9 illustrates a state where the expansion device 50 executes the cooling process. Immediately after the distension process, the irradiator 60 has reached the second position P2 on the front side of the expansion device 50. In the cooling process, the control unit 71 blows air to the air-blowing unit 64 while moving the irradiator 60 by the conveyance motor 55. More specifically, the control unit 71 stops the supply of the power supply voltage to the irradiator 60 and turns off the lamp heater 61. Thereafter, the control unit 71 drives the air-blowing unit 64 to supply the air outside the housing 51 to the inside of the irradiator 60 and the housing 51. In this manner, the control unit 71 drives the conveyance motor 55 in a state where the air-blowing unit 64 is caused to blow air, thereby moving the irradiator 60 from the second position P2 toward the first position P1, that is, in the second direction.

At this time, the control unit 71 drives the ventilation unit 54 to discharge the air inside the housing 51 to the outside. When the air-blowing unit 64 and the ventilation unit 54 are driven, the air which has been supplied from the outside by the air-blowing unit 64 flows to the back side of the expansion device 50 and is discharged from the ventilation unit 54 to the outside as illustrated in FIG. 9.

The air-blowing unit 64 is attached to the irradiator 60, and thus, moves together with the irradiator 60. Thus, as the air-blowing unit 64 is caused to blow air while returning the irradiator 60 to the initial position, it is possible to cool not only the irradiator 60 but also the entire interior of the housing 51 including the thermally-expandable sheet 100. As the thermally-expandable sheet 100 after subjected to the distension process is cooled, it is possible to suppress deformation of the thermally-expandable sheet 100 caused by heat.

<Drying Process>

When the ink which has been applied in the printing device 40 is not sufficiently dried, the thermally-expandable sheet 100 is not heated to the temperature necessary for the distension process, and hardly distends to the desired height. Thus, the control unit 71 executes the drying process of drying the thermally-expandable sheet 100 after the color image has been printed by the printing device 40.

In the drying process, the control unit 71 causes the irradiator 60 to emit light while moving the irradiator 60 by the conveyance motor 55 such that the thermally-expandable sheet 100 is maintained at a temperature lower than the prescribed temperature. More specifically, the control unit 71 supplies the power supply voltage to the irradiator 60 to turn on the lamp heater 61. Then, the control unit 71 drives the conveyance motor 55 in a state where the irradiator 60 is caused to emit light. Accordingly, the control unit 71 moves the irradiator 60 from the first position P1 toward the second position P2, that is, in the first direction by the prescribed distance as illustrated in FIG. 8.

In this manner, the control unit 71 controls the irradiator 60 to irradiate the entire front face of the thermally-expandable sheet 100 with light by moving the irradiator 60 from an end to the other end of the thermally-expandable sheet 100. As a result, moisture contained in the thermally-expandable sheet 100 is evaporated, and the thermally-expandable sheet 100 is dried.

When light is emitted by the irradiator 60, the portion of the thermally-expandable sheet 100 on which the grayscale image containing carbon black has been printed generates heat. In the drying process, the control unit 71 dries the thermally-expandable sheet 100 without distending the thermally-expandable sheet 100. Thus, the moving speed of the thermally-expandable sheet 100 and the intensity of light emitted from the irradiator 60 are set in advance such that it is possible to maintain the thermally-expandable sheet 100 at a temperature lower than the prescribed temperature, that is, the thermally-expandable sheet 100 is not heated above the prescribed temperature.

In such a drying process, the control unit 71 controls the air-blowing unit 64 so as to stop blowing air while the irradiator 60 is caused to emit light. When the irradiation of light by the irradiator 60 and the air-blowing to the irradiator 60 are simultaneously performed, the heat of the lamp heater 61 is transmitted to the thermally-expandable sheet 100 by the flow of air due to the air-blowing. As a result, the manner in which the thermally-expandable sheet 100 is heated is not stabilized, and it is difficult for the thermally-expandable sheet 100 to be properly dried. In order to avoid such a situation, the control unit 71 causes the air-blowing unit 64 not to blow air while causing the irradiator 60 to emit light and causes the irradiator 60 not to emit light while causing the air-blowing unit 64 to blow air in the drying process.

After executing the drying process, the control unit 71 controls the irradiator 60 to stop the irradiation of light and then controls the air-blowing unit 64 to start blowing air. Then, the control unit 71 executes the cooling process of cooling the irradiator 60 by causing the air-blowing unit 64 to blow air while moving the irradiator 60 in the second direction.

The cooling process after the drying process is the same as the cooling process after the distension process. More specifically, the control unit 71 drives the conveyance motor 55 while causing the air-blowing unit 64 to blow air. Accordingly, the irradiator 60 moves from the second position P2 toward the first position P1 while the air-blowing unit 64 blows air as illustrated in FIG. 9. As a result, the lamp heater 61 is cooled and the thermally-expandable sheet 100 that has been heated is cooled.

<Preheating Process>

Before executing the distension process, the control unit 71 executes the preheating process (preheating) to preliminarily heat the irradiator 60 by causing the irradiator 60 to emit light. The preheating process is a process of turning on the lamp heater 61 and heating the irradiator 60 in advance to warm up the irradiator 60 such that the expansion device 50 can smoothly start the distension process. The control unit 71 executes the preheating process, for example, immediately after the power supply to the expansion device 50 is turned on or when the expansion device 50 has not executed the distension process for a predetermined time or longer.

In the preheating process, the control unit 71 causes the irradiator 60 to emit light by turning on the lamp heater 61 to raise the temperature of the irradiator 60 to a preset preheating temperature Tph. The preheating temperature Tph is an upper limit temperature in the preheating process and is set to a temperature (for example, 70° C.) lower than the prescribed temperature such that the thermally-expandable sheet 100 does not start distending.

The control unit 71 refers to the temperature of the reflection plate 62 measured by the temperature sensor 63 as the temperature of the irradiator 60. Then, when the temperature of the reflection plate 62 increases to the preheating temperature Tph, the control unit 71 controls the irradiator 60 to stop emitting light. Incidentally, the control unit 71 may control the irradiator 60 to reciprocate between the first position P1 and the second position P2 so as to warm up the entire thermally-expandable sheet 100 thoroughly while the preheating process is executed.

After executing the preheating process in this manner, the control unit 71 controls the irradiator 60 to stop emitting light and controls the air-blowing unit 64 to start blowing air, thereby lowering the temperature of the irradiator 60 to the preset temperature. The preset temperature is the temperature at which the expansion device 50 starts the distension process. When the temperature of the irradiator 60 is lowered to the preset temperature, the control unit 71 controls the air-blowing unit 64 to stop blowing air and controls the irradiator 60 to start emitting light, thereby starting the distension process.

In such a preheating process, the control unit 71 controls the air-blowing unit 64 so as to stop blowing air while the irradiator 60 is caused to emit light. A reason of such control is the same as the distension process and the drying process. That is, when the irradiation of light by the irradiator 60 and the air-blowing to the irradiator 60 are simultaneously performed, the heat of the lamp heater 61 is transmitted to the thermally-expandable sheet 100 by the flow of air due to the air-blowing, and it is difficult to properly heat the thermally-expandable sheet 100. In order to avoid such a situation, the control unit 71 causes the air-blowing unit 64 not to blow air while causing the irradiator 60 to emit light and causes the irradiator 60 not to emit light while causing the air-blowing unit 64 to blow air in the preheating process.

<Three-Dimensional Image Formation Process>

A description will be given regarding flow of a three-dimensional image formation process that is executed in the three-dimensional image forming system 1 configured as described above with reference to a flowchart illustrated in FIG. 10 and cross sectional views of the thermally-expandable sheet 100 illustrated in FIGS. 11A to 11E.

Figure 11A:
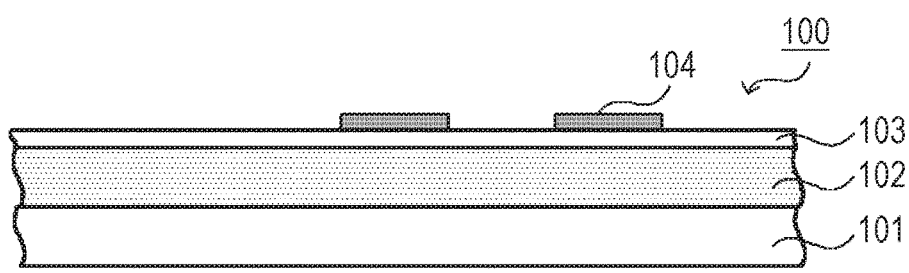
FIGS. 11A to 11E are views illustrating states where a three-dimensional image is formed on the thermally-expandable sheet illustrated in FIG. 1 in a stepwise manner.

Firstly, the user prepares the thermally-expandable sheet 100 before a three-dimensional image is formed thereon, and designates the color image data, the front face foaming data, and the back face foaming data via the operation unit 33 of the terminal device 30. Then, the thermally-expandable sheet 100 is inserted into the printing device 40 with the front face thereof facing upward. The printing device 40 prints a light-to-heat conversion layer 104 on the front face of the inserted thermally-expandable sheet 100 (Step S1). The light-to-heat conversion layer 104 is a layer formed using a material that converts light into heat, specifically, a black ink containing carbon black. The printing device 40 ejects the black ink containing carbon black on the front face of the thermally-expandable sheet 100 in accordance with the designated front face foaming data. As a result, the light-to-heat conversion layer 104 is formed on the ink-receiving layer 103 as illustrated in FIG. 11A.

Figure 11B:
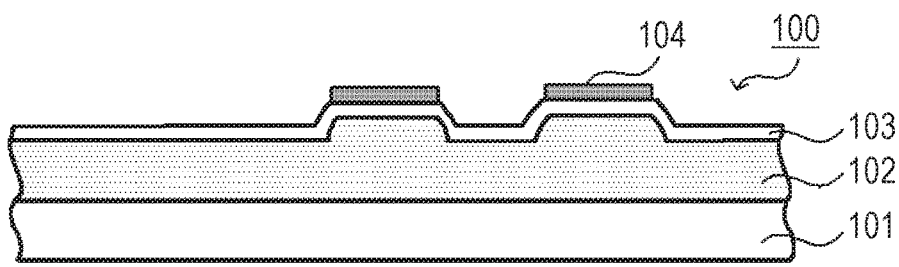

Secondly, the user inserts the thermally-expandable sheet 100 on which the light-to-heat conversion layer 104 has been printed into the expansion device 50 with the front face thereof facing upward. The expansion device 50 irradiates the front face of the inserted thermally-expandable sheet 100 with light by the irradiator 60 (Step S2). The light-to-heat conversion layer 104 which has been printed on the front face of the thermally-expandable sheet 100 generates heat by absorbing the emitted light. As a result, a portion of the thermally-expandable sheet 100 on which the light-to-heat conversion layer 104 has been printed swells and distends as illustrated in FIG. 11B.

Figure 11C:
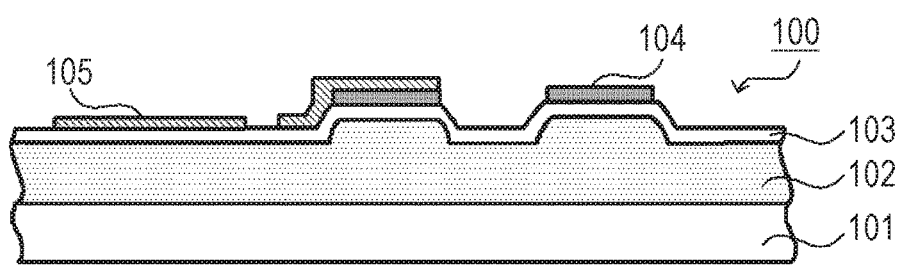

Thirdly, the user inserts the thermally-expandable sheet 100 whose front face has been heated and distended into the printing device 40 with the front face facing upward. The printing device 40 prints a color ink layer 105 on the front face of the inserted thermally-expandable sheet 100 (Step S3). More specifically, the printing device 40 ejects each ink of cyan C, magenta M, and yellow Y onto the front face of the thermally-expandable sheet 100 in accordance with the designated color image data. As a result, the color ink layer 105 is formed on the ink-receiving layer 103 and the light-to-heat conversion layer 104 as illustrated in FIG. 11C.

Incidentally, when an image of a black or gray color is printed in the color ink layer 105, the printing device 40 forms the image by mixing inks of three colors of cyan C, magenta M, and yellow Y or by further using a black ink that does not contain carbon black. Accordingly, the portion formed by the color ink layer 105 avoids being heated in expansion device 50.

Fourthly, the user turns over the thermally-expandable sheet 100 on which the color ink layer 105 has been printed, and inserts the thermally-expandable sheet 100 into the expansion device 50 with the back face thereof facing upward. The expansion device 50 irradiates the back face of the inserted thermally-expandable sheet 100 with light by the irradiator 60, and heats the thermally-expandable sheet 100 from the back face. Accordingly, the expansion device 50 volatilizes a solvent contained in the color ink layer 105 to dry the color ink layer 105 (Step S4). The thermally-expandable sheet 100 is easily distended in a subsequent step by drying the color ink layer 105.

Figure 11D:
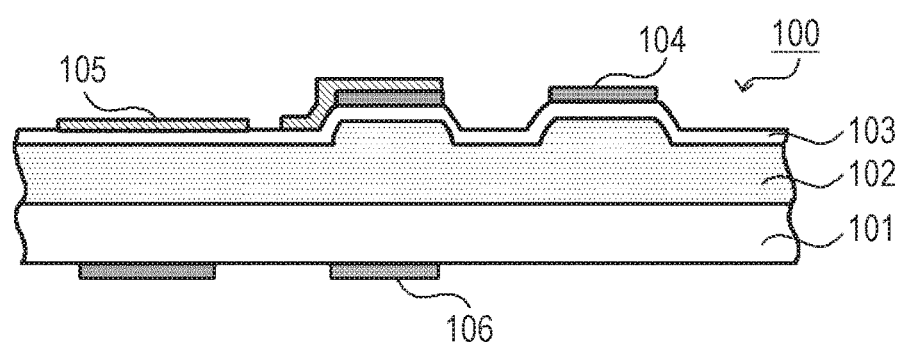

Fifthly, the user inserts the thermally-expandable sheet 100 on which the color ink layer 105 has been printed into the printing device 40 with the back face thereof facing upward. The printing device 40 prints a light-to-heat conversion layer 106 on the back face of the inserted thermally-expandable sheet 100 (Step S5). The light-to-heat conversion layer 106 is a layer formed using a material that converts light into heat, specifically, a black ink containing carbon black, which is similar to the light-to-heat conversion layer 104 printed on the front face of the thermally-expandable sheet 100. The printing device 40 ejects the black ink containing carbon black on the back face of the thermally-expandable sheet 100 in accordance with the designated back face foaming data. As a result, the light-to-heat conversion layer 106 is formed on the back face of the base member 101 as illustrated in FIG. 11D.

Figure 11E:
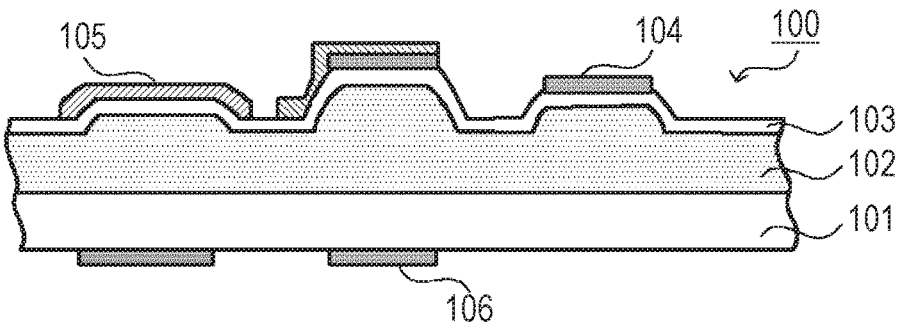

Sixthly, the user inserts the thermally-expandable sheet 100 on which the light-to-heat conversion layer 106 has been printed into the expansion device 50 with the back face thereof facing upward. The expansion device 50 irradiates the back face of the inserted thermally-expandable sheet 100 with light by the irradiator 60 (Step S6). The light-to-heat conversion layer 106 which has been printed on the back face of the thermally-expandable sheet 100 generates heat by absorbing the emitted light. As a result, a portion of the thermally-expandable sheet 100 on which the light-to-heat conversion layer 106 has been printed swells and distends as illustrated in FIG. 11E.

Incidentally, the light-to-heat conversion layer 104 and the color ink layer 105 are illustrated to be formed on the ink-receiving layer 103 in FIGS. 11A to 11E in order to facilitate understanding. However, more precisely, the color ink and the black ink are absorbed inside the ink-receiving layer 103, and thus, formed in the middle of the ink-receiving layer 103.

As described above, the three-dimensional color image is formed on the thermally-expandable sheet 100 as the portion of the thermally-expandable sheet 100 where the light-to-heat conversion layers 104 and 106 have been formed distends. Since the light-to-heat conversion layers 104 and 106 are heated to a greater extent at higher density, the light-to-heat conversion layers 104 and 106 dispend more. Thus, three-dimensional images of various shapes can be obtained by adjusting the density of the light-to-heat conversion layers 104 and 106 in accordance with a target height.

Any one of the process of heating the thermally-expandable sheet 100 from the front face and the process of heating the thermally-expandable sheet 100 from the back face may be omitted. For example, when only the front face of the thermally-expandable sheet 100 is heated and distended, Steps S5 and S6 in FIG. 10 are omitted. On the other hand, when only the back face of the thermally-expandable sheet 100 is heated and distended, Steps S1 and S2 in FIG. 10 are omitted. Further, the printing of the color image in Step S3 may be executed after the process of heating the thermally-expandable sheet 100 from the back face in Step S6.

Further, when forming a three-dimensional monochrome image, the printing device 40 may print a monochrome image instead of the color image in Step S3. In this case, a layer made of a black ink is formed on the ink-receiving layer 103 and the light-to-heat conversion layer 104 instead of the color ink layer 105.

<Operation of Expansion Device 50>

Figure 12:
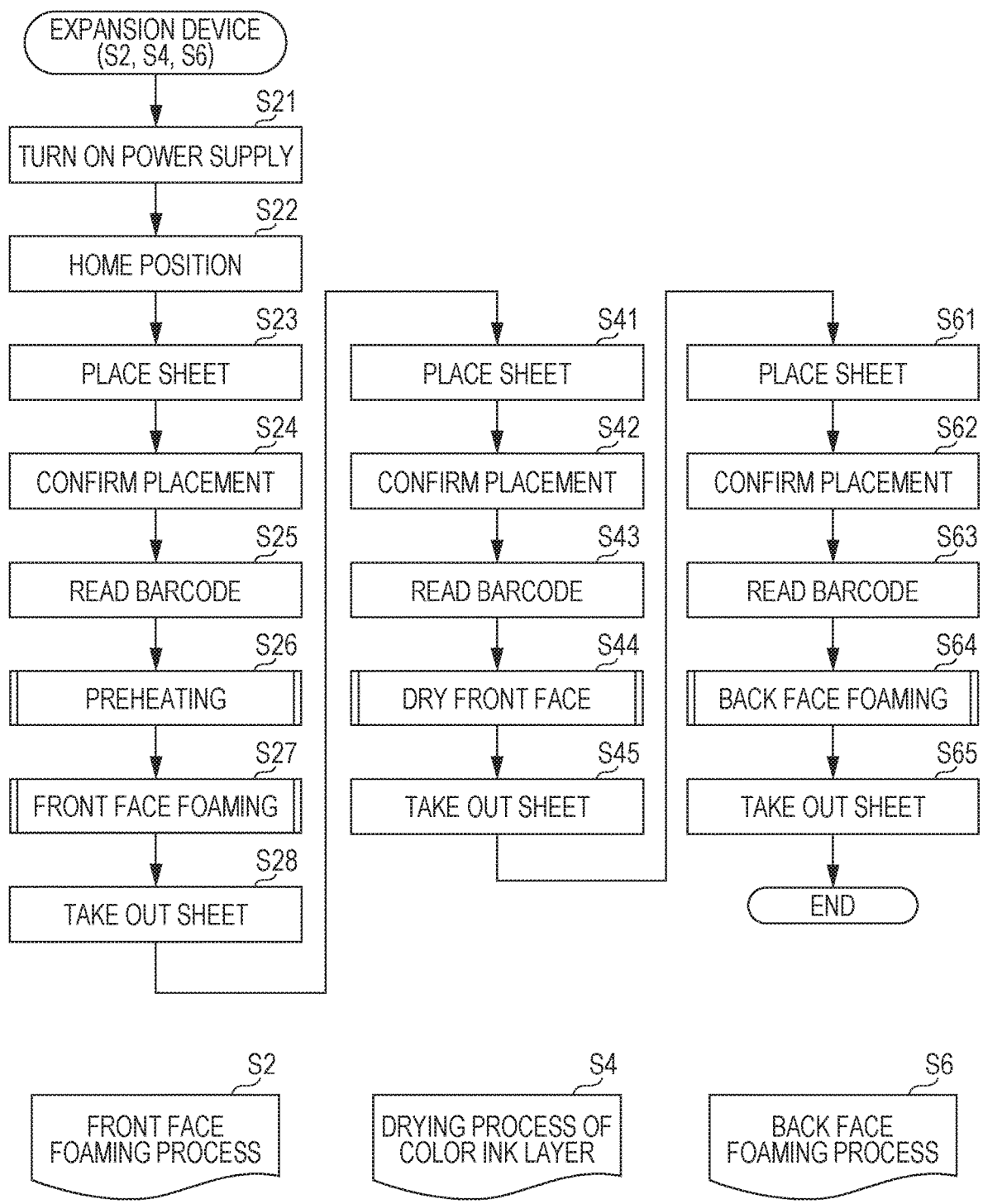
FIG. 12 is a flowchart illustrating a flow of a process that is executed by the expansion device according to the embodiment of the invention.

Next, details of the processing of Steps S2, S4, and S6 executed by the expansion device 50 will be described with reference to a flowchart illustrated in FIG. 12.

In a front face foaming process (Step S2), when the user turns on the power supply (Step S21), the expansion device 50 sets the irradiator 60 at the home position (Step S22). As a result, the position of the irradiator 60 is initialized.

Subsequently, the user opens the insertion section 52 to take out the tray 53 and places the thermally-expandable sheet 100 on the front face of which the light-to-heat conversion layer 104 has been printed in the printing device 40 on the tray 53 with the front face thereof facing upward (Step S23). The tray 53 on which the thermally-expandable sheet 100 has been placed is inserted into the housing 51 and arranged at the position that can be irradiated with light by the irradiator 60.

Thereafter, the user operates the operation unit 33 of the terminal device 30 and inputs an instruction to distend the thermally-expandable sheet 100. When receiving the instruction input by the user from the terminal device 30, the control unit 71 of the expansion device 50 confirms the placement of the thermally-expandable sheet 100 (Step S24). If the thermally-expandable sheet 100 has not been correctly placed, the control unit 71 issues a warning to request the user to properly place the thermally-expandable sheet 100.

Subsequently, the control unit 71 reads the barcode B attached to the back face of the thermally-expandable sheet 100 via the barcode reader 65 (Step S25). If the barcode B attached to the thermally-expandable sheet 100 has not been read, the control unit 71 informs the user that it is difficult to use the thermally-expandable sheet 100 to request the user to replace the thermally-expandable sheet 100 with a proper one.

When the reading of the barcode B has succeeded, the control unit 71 executes preheating (a preheating process) (Step S26). Details of preheating in Step S26 will be described with reference to a flowchart illustrated in FIG. 13.

Figure 13:
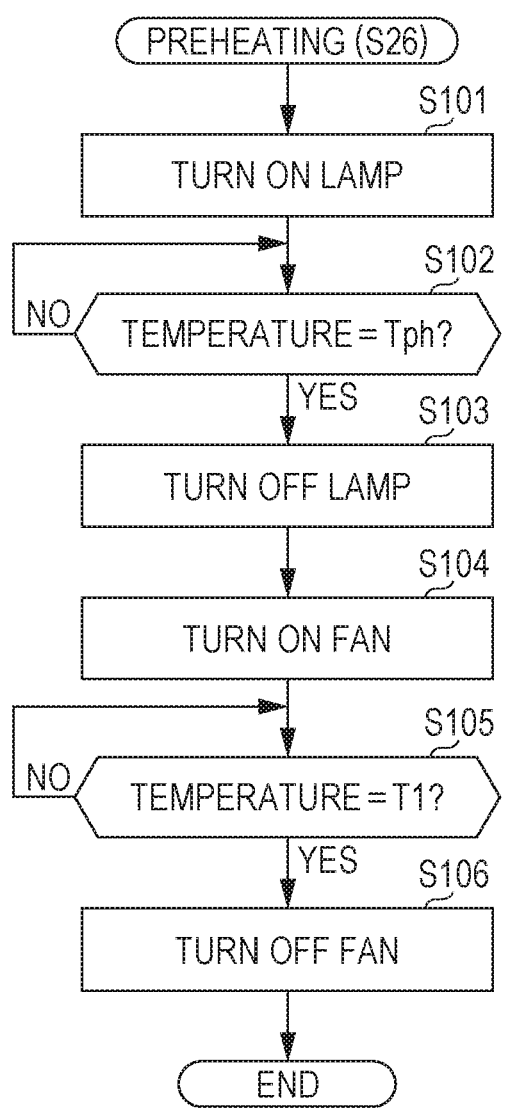
FIG. 13 is a flowchart illustrating a flow of a preheating process that is executed by the expansion device according to the embodiment of the invention.

When the preheating illustrated in FIG. 13 is started, the control unit 71 makes an ON-state of (turns on) the lamp heater 61 and causes the irradiator 60 to emit light (Step S101). When the lamp heater 61 is turned on, the temperature of the reflection plate 62 starts to increase. The control unit 71 determines whether the temperature of the reflection plate 62 measured by the temperature sensor 63 has increased to the preheating temperature Tph (Step S102).

When the temperature of the reflection plate 62 has not increased to the preheating temperature Tph (Step S102; NO), the control unit 71 remains at Step S102. Thereafter, when the temperature of the reflection plate 62 increases to the preheating temperature Tph (Step S102; YES), the control unit 71 makes an OFF-state of (turns off) the lamp heater 61 and causes the irradiator 60 to stop emitting light (Step S103). After turning off the lamp heater 61, the control unit 71 turns on the fan of the air-blowing unit 64 and causes the air-blowing unit 64 to blow air (Step S104).

When the fan is driven, the temperature of the reflection plate 62 starts to decrease. The control unit 71 determines whether the temperature of the reflection plate 62 measured by the temperature sensor 63 has decreased to a first temperature T1 (Step S105). The first temperature T1 is a temperature at which the expansion device 50 starts the distension process and is set to, for example, 40° C.

When the temperature of the reflection plate 62 has not decreased to the first temperature T1 (Step S105; NO), the control unit 71 remains at Step S105. Thereafter, when the temperature of the reflection plate 62 decreases to the first temperature T1 (Step S105; YES), the control unit 71 turns off the fan and causes the air-blowing unit 64 to stop blowing air (Step S106). As a result, the preheating process illustrated in FIG. 13 ends.

A description will be given returning to the flowchart illustrated in FIG. 12. After executing the preheating, the control unit 71 executes a front face foaming process (Step S27). Details of the front face foaming process will be described with reference to a flowchart illustrated in FIG. 14.

Figure 14:
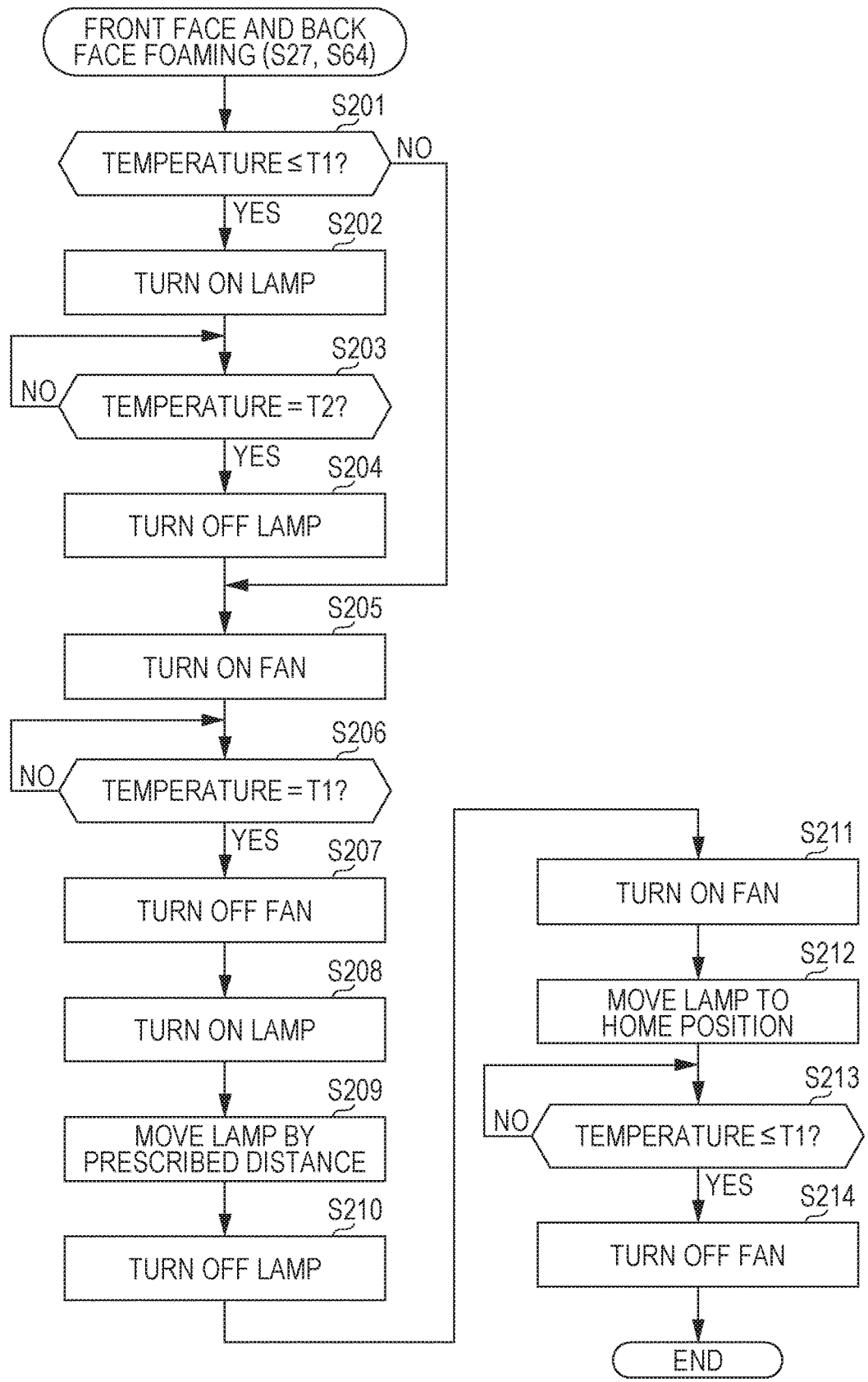
FIG. 14 is a flowchart illustrating a flow of a front and back face foaming process that is executed by the expansion device according to the embodiment of the invention.

When the front face foaming process illustrated in FIG. 14 is started, the control unit 71 determines whether the temperature of the reflection plate 62 is equal to or lower than the first temperature T1 which is the temperature at which the foaming process is started (Step S201).

When the temperature of the reflection plate 62 is equal to or lower than the first temperature T1 (Step S201; YES), the control unit 71 turns on the lamp heater 61 and causes the irradiator 60 to emit light (Step S202). Then, the control unit 71 determines whether the temperature of the reflection plate 62 has increased to a second temperature T2 (Step S203). The second temperature T2 is higher than the first temperature T1 and is set to, for example, 45° C.

When the temperature of the reflection plate 62 has not increased to the second temperature T2 (Step S203; NO), the control unit 71 remains at Step S203. Thereafter, when the temperature of the reflection plate 62 increases to the second temperature T2 (Step S203; YES), the control unit 71 turns off the lamp heater 61 and causes the irradiator 60 to stop emitting light (Step S204). On the other hand, when the temperature of the reflection plate 62 is higher than the first temperature T1 (Step S201; NO), there is no need to raise the temperature, so the control unit 71 skips the processing of Steps S202 to S204.

Thereafter, the control unit 71 turns on the fan of the air-blowing unit 64 and causes the air-blowing unit 64 to blow air (Step S205). Then, the control unit 71 determines whether the temperature of the reflection plate 62 has decreased to the first temperature T1 (Step S206). When the temperature of the reflection plate 62 has not decreased to the first temperature T1 (Step S206; NO), the control unit 71 remains at Step S206. Thereafter, when the temperature of the reflection plate 62 decreases to the first temperature T1 (Step S206; YES), the control unit 71 turns off the fan to stop blowing air (Step S207). In this manner, the temperature of the reflection plate 62 is adjusted to the first temperature T1 which is the temperature at which the foaming process starts.

When the temperature of the reflection plate 62 is adjusted to the first temperature T1, the control unit 71 starts the process of irradiating the thermally-expandable sheet 100 with light to distend the thermally-expandable sheet 100. More specifically, the control unit 71 turns on the lamp heater 61 and causes the irradiator 60 to emit light (Step S208). Then, the control unit 71 stands by for a lapse of a prescribed time Since the ON-state of the lamp heater 61, and moves the lamp heater 61 by the prescribed distance (Step S209). The prescribed time is, for example, 5 seconds.

More specifically, the control unit 71 drives the conveyance motor 55 while causing the irradiator 60 to emit light. Accordingly, the irradiator 60 moves by the prescribed distance from the first position P1 to the second position P2 while emitting light as illustrated in FIG. 8. As a result, the portion of the thermally-expandable sheet 100 on which the gray-scale image has been printed is heated to a temperature higher than the prescribed temperature and distends.

When the lamp heater 61 is moved, the control unit 71 turns off the lamp heater 61 and causes the irradiator 60 to stop emitting light (Step S210). Thereafter, the control unit 71 executes the process of cooling the heated lamp heater 61 and thermally-expandable sheet 100. More specifically, the control unit 71 turns on the fan of the air-blowing unit 64 and causes the air-blowing unit 64 to blow air (Step S211). Then, the control unit 71 moves the lamp heater 61 to the home position (Step S212).

More specifically, the control unit 71 drives the conveyance motor 55 while causing the air-blowing unit 64 to blow air. Accordingly, the irradiator 60 moves from the second position P2 toward the first position P1 while the air-blowing unit 64 blows air as illustrated in FIG. 9. As a result, the lamp heater 61 is cooled and the thermally-expandable sheet 100 that has been heated is cooled.

After moving the lamp heater 61 to the home position, the control unit 71 determines whether the temperature of the reflection plate 62 has decreased to the first temperature T1 or lower (Step S213). When the temperature of the reflection plate 62 has not decreased to the first temperature T1 or lower (Step S213: NO), the control unit 71 remains at Step S213. Thereafter, when the temperature of the reflection plate 62 decreases to the first temperature T1 or lower (Step S213: YES), the control unit 71 turns off the fan of the air-blowing unit 64 and causes the air-blowing unit 64 to stop blowing air (Step S214). In this manner, the front face foaming process illustrated in FIG. 14 ends.

A description will be given returning to the flowchart illustrated in FIG. 12. After executing the front face foaming process, the user opens the insertion section 52, draws out the tray 53, and takes out the thermally-expandable sheet 100 from the expansion device 50 (Step S28). The thermally-expandable sheet 100 is inserted into the printing device 40, and the color ink layer 105 is printed on the front face thereof.

Subsequently, the processing of the expansion device 50 proceeds to the drying process (Step S4) of the color ink layer 105. The user places the thermally-expandable sheet 100 on the tray 53 with the front face on which the color ink layer 105 has been printed facing upward (Step S41). Subsequently, the control unit 71 confirms the placement of the thermally-expandable sheet 100 (Step S42) and reads the barcode B (Step S43). The processing of Steps S41 to S43 is the same as the processing of Steps S23 to S25.

When the reading of the barcode B has been succeeded, the control unit 71 executes a front face drying process (Step S44). Details of the front face drying process in Step S44 will be described with reference to a flowchart illustrated in FIG. 15.

Figure 15:
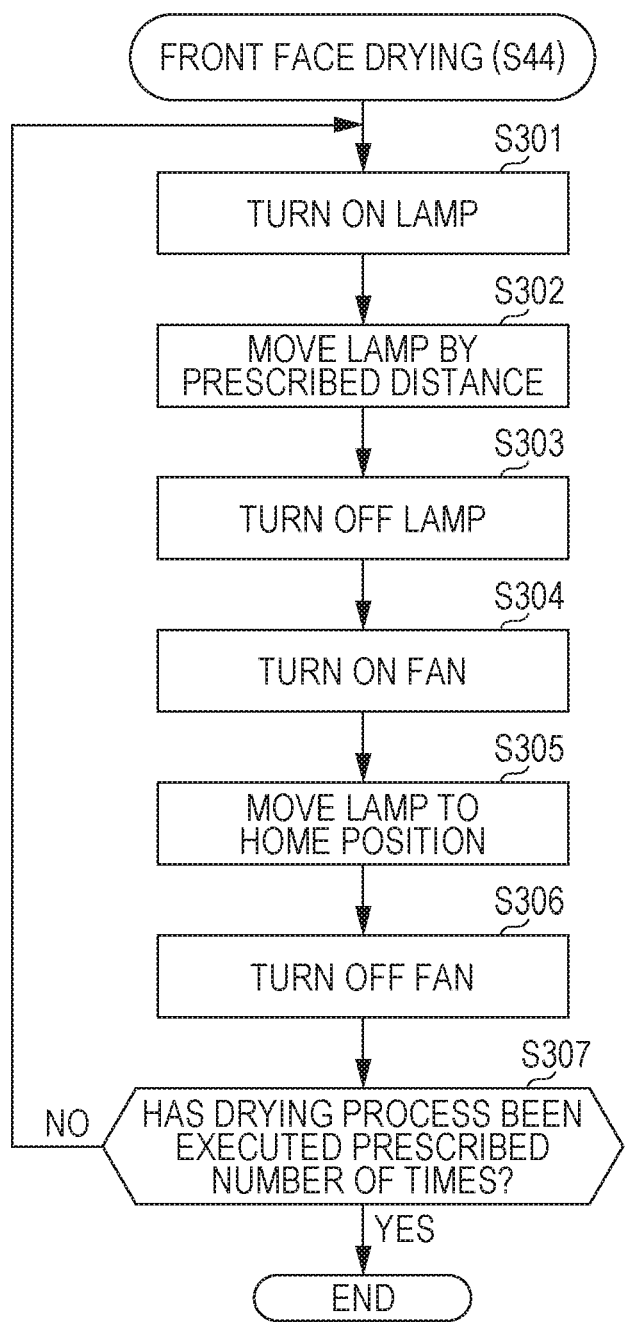
FIG. 15 is a flowchart illustrating a flow of a front face drying process that is executed by the expansion device according to the embodiment of the invention.

When the drying process illustrated in FIG. 15 is started, the control unit 71 turns on the lamp heater 61 and causes the irradiator 60 to emit light (Step S301). Then, the control unit 71 moves the lamp heater 61 by a prescribed distance at the speed set so as to heat the thermally-expandable sheet 100 to a temperature lower than the prescribed temperature (Step S302). Accordingly, the color ink layer 105 which has been printed on the front face of the thermally-expandable sheet 100 is dried. The prescribed distance is the same as that in the distension process.

When the lamp heater 61 is moved, the control unit 71 turns off the lamp heater 61 and causes the irradiator 60 to stop emitting light (Step S303). Thereafter, the control unit 71 turns on the fan of the air-blowing unit 64 and causes the air-blowing unit 64 to blow air (Step S304). Then, the control unit 71 moves the lamp heater 61 to the home position (Step S305). Accordingly, the lamp heater 61 is cooled and the thermally-expandable sheet 100 that has been heated is cooled.

After moving the lamp heater 61 to the home position, the control unit 71 turns off the fan of the air-blowing unit 64 and causes the air-blowing unit 64 to stop blowing air (Step S306). Thereafter, the control unit 71 determines whether such a drying process has been executed a prescribed number of times (Step S307).

When the drying process has not been executed the prescribed number of times (Step S307; NO), the control unit 71 returns the processing to Step S301 and repeats the processing of Steps S301 to S306. Accordingly, the control unit 71 sufficiently dries the thermally-expandable sheet 100. The prescribed number of times is set to, for example, once to three times. Eventually, when the drying process has been executed the prescribed number of times (Step S307; YES), the front face drying process illustrated in FIG. 15 ends.

A description will be given returning to the flowchart illustrated in FIG. 12. After executing the front face drying process, the user opens the insertion section 52, draws out the tray 53, and takes out the thermally-expandable sheet 100 from the expansion device 50 (Step S45). The thermally-expandable sheet 100 is inserted into the printing device 40, and the light-to-heat conversion layer 106 is printed on the back face thereof.

Subsequently, the processing of the expansion device 50 proceeds to a back face foaming process (Step S6). The user places the thermally-expandable sheet 100 on the tray 53 with the back face on which the light-to-heat conversion layer 106 has been printed facing upward (Step S61). Subsequently, the control unit 71 confirms the placement of the thermally-expandable sheet 100 (Step S62) and reads the barcode B (Step S63). The processing of Steps S61 to S63 is the same as the processing of Steps S23 to S25.

When the reading of the barcode B has been succeeded, the control unit 71 executes a back face drying process (Step S64). Details of the back face foaming process in Step S64 are similarly described in the flowchart illustrated in FIG. 14 by replacing the "front face" with the "back face".

A description will be given returning to the flowchart illustrated in FIG. 12. After executing the back face foaming process, the user opens the insertion section 52, draws out the tray 53, and takes out the thermally-expandable sheet 100 from the expansion device 50 (Step S65). In this manner, the processing of the expansion device 50 illustrated in FIG. 12 ends. As a result, the thermally-expandable sheet 100 on which the desired three-dimensional image has been formed is obtained.

As described above, the expansion device 50 according to the present embodiment distends the thermally-expandable sheet 100 by causing the irradiator 60 to emit light while moving the irradiator 60 along the front or back face of the thermally-expandable sheet 100. At that time, the expansion device 50 does not cause the air-blowing unit 64 to blow air while the irradiator 60 is caused to emit light. As the irradiation of light using the irradiator 60 and the blowing of air to the irradiator 60 are not simultaneously performed in this manner, it is possible to suppress the change in the quality of distension of the thermally-expandable sheet 100 caused when the heat of the lamp heater 61 is transmitted to the thermally-expandable sheet 100 due to the blowing of air. As a result, it is possible to distend the thermally-expandable sheet 100 appropriately and accurately while suppressing the occurrence of the abnormality so that a stable three-dimensional image can be obtained.

Further, the expansion device 50 according to the present embodiment does not cause the air-blowing unit 64 to blow air while the irradiator 60 is cause to emit light even during the drying process and the preheating process. Accordingly, the thermally-expandable sheet 100 can be heated under precise control, and thus, it is possible to appropriately execute the drying process and the preheating process while suppressing the occurrence of the abnormality.

Modification

Although the embodiment of the invention has been described above, the above-described embodiment is merely an example, and an application range of the invention is not limited thereto. That is, the embodiment of the invention can be applied in various ways, and all embodiments fall within the scope of the invention.

For example, the control unit 71 executes the cooling process after the distension process and the cooling process after the drying process while moving the irradiator 60 in the above embodiment. However, the control unit 71 may execute these cooling processes without moving the irradiator 60 in the invention. Further, the control unit 71 executes each of the distension process and the drying process when moving the irradiator 60 in the first direction. In the invention, however, the control unit 71 may cause the irradiator 60 to reciprocate once or a plurality of times between the first position P1 and the second position P2 in order to execute each process if necessary.

In the above embodiment, the initial position (home position) of the irradiator 60 is on the back side of the expansion device 50. However, the initial position of the irradiator 60 may be on the front side of the expansion device 50. When the initial position of the irradiator 60 is on the front side of the expansion device 50, the description can be made similarly as the above embodiment by reversing the positional relationship between the first position P1 and the second position P2. Further, the ventilation unit 54 may be provided at a position other than the back side of the expansion device 50.

In the above embodiment, the thermally-expandable sheet 100 includes the base member 101, the thermally-distensible layer 102, and the ink-receiving layer 103. In the invention, however, the configuration of the thermally-expandable sheet 100 is not limited thereto. For example, the thermally-expandable sheet 100 does not necessarily include the ink-receiving layer 103. Alternatively, the thermally-expandable sheet 100 may be provided with a layer made of another arbitrary material between the base member 101 and the thermally-distensible layer 102, or between the thermally-distensible layer 102 and the ink-receiving layer 103. Further, the thermally-expandable sheet 100 may have the ink-receiving layer 103 not only on the front side of the base member 101 but also on the back side of the base member 101.

In the above embodiment, the terminal device 30, the printing device 40, and the expansion device 50 are independent devices. In the invention, however, at least two of the terminal device 30, the printing device 40, and the expansion device 50 may be integrated.

In the above embodiment, the expansion device 50 includes the conveyance motor 55 as the movement means for moving the irradiator 60, and distends the thermally-expandable sheet 100 in a method of irradiating the thermally-expandable sheet 100 at a fixed position while moving the irradiator 60. However, the expansion device 50 may include a conveyance mechanism that conveys the thermally-expandable sheet 100 and distend the thermally-expandable sheet 100 in a method of irradiating the conveyed thermally-expandable sheet 100 with light from the irradiator 60 at a fixed position. In this case, the conveyance mechanism functions as the movement means for moving the thermally-expandable sheet 100. In other words, the expansion device 50 may distend the thermally-expandable sheet 100 using any method as long as the thermally-expandable sheet 100 and the irradiator 60 can be moved relative to each other.

A printing method of the printing device 40 is not limited to the ink jet method. For example, the printing device 40 may be a laser printer, and an image may be printed using a toner and a developer. Further, the light-to-heat conversion layers 104 and 106 may be formed using a material other than black ink containing carbon black as long as the material easily converts light into heat. In this case, the light-to-heat conversion layers 104 and 106 may be formed by a means other than the printing device 40.

In the above embodiment, the control unit 71 controls the air-blowing unit 64 to stop blowing air while the irradiator 60 is caused to emit light (for a predetermined period). In the invention, however, the control unit 71 may weaken blowing air to an extent that the quality of distension of the thermally-expandable sheet 100 does not change without being limited to causing the air-blowing unit 64 to stop blowing air. In other words, the control unit 71 does not necessarily cause the air-blowing unit 64 to completely stop blowing air, and may cause the air-blowing unit 64 to blow air if the blowing of air is performed with strength that is enough weak such that the quality of expansion of the thermally-expandable sheet 100 does not change. Alternatively, the control unit 71 may change a direction of air blown by the air-blowing unit 64 without being limited to changing the strength of the air-blowing. As the direction of air blown by the air-blowing unit 64 is changed from a direction toward the irradiator 60 to a direction toward one other than the irradiator 60, it is possible to stop or weaken blowing air toward the irradiator 60 without changing the strength of the air-blowing.

In the above embodiment, the control unit 71 controls the irradiator 60 to stop emitting light while the air-blowing unit 64 is caused to blow air. In the invention, however, the control unit 71 may weaken the light to an extent that the quality of distension of the thermally-expandable sheet 100 does not change without being limited to causing the irradiator 60 to stop emitting light.

In the above embodiment, the control unit 71 of the expansion device 50 includes the CPU, and executes the distension process, the cooling process, the drying process, and the preheating process through the function of the CPU. In the expansion device 50 according to the invention, however, the control unit 71 may include dedicated hardware such as an application specific integrated circuit (ASIC) and a field-programmable gate array (FPGA), various control circuits, or the like instead of the CPU, and the dedicated hardware may perform the distension process, the cooling process, the drying process, and the preheating process. In this case, the respective processes may be executed by individual hardware, or respective processes may be executed by a single piece of hardware. Further, some of the processes may be executed by dedicated hardware and others may be executed by software or firmware.

Incidentally, not only it is possible to provide an expansion device including with the configuration for realizing the functions according to the invention in advance, but also it is possible to cause a computer that controls the expansion device to realize each functional configuration of the expansion device 50 exemplified in the above embodiment by application of a program. That is, it is possible to configure the program for realizing each functional configuration of the expansion device 50 exemplified in the above embodiment to be applied when being executed by a CPU or the like, which controls an existing information processing device or the like.

A method of applying such a program is arbitrary. The program can be applied in a form of being stored in a computer-readable recording medium such as a flexible disk, a compact disc (CD)-ROM, a digital versatile disc (DVD)-ROM, and a memory card, Furthermore, the program may be superimposed on a carrier wave and applied via a communication medium such as the Internet. For example, a program may be posted on a bulletin board system (BBS) on a communication network and distributed. Then, it may be configured such that the above processes can be executed by starting this program and executing the program in the same manner as other application programs under control of an operating system (OS).

Although the preferred embodiments of the invention have been described as above, the invention is not limited to such specific embodiments, and the invention includes inventions described in the claims and equivalents thereof.

What is claimed is:

1. An expansion device comprising:
    an irradiation unit configured to irradiate a thermally-expandable sheet with light;
    a movement unit configured to relatively move the thermally-expandable sheet and the irradiation unit;
    an air-blowing unit configured to cool the irradiation unit by blowing air to the irradiation unit, wherein the air-blowing unit is provided at a higher level in the expansion device than the irradiation unit;
    a ventilation unit configured to discharge air from inside the expansion device to outside the expansion device, wherein the ventilation unit is provided at a lower level in the expansion device than the irradiation unit; and
    a control unit configured to execute a distension process to distend the thermally-expandable sheet by controlling the irradiation unit to emit light while relatively moving the thermally-expandable sheet and the irradiation unit by the movement unit,
    wherein the control unit is configured to control the air-blowing unit to stop or weaken blowing of the air toward the irradiation unit while the irradiation unit emits light in the distension process.

2. The expansion device according to claim 1, wherein the irradiation unit and the air-blowing unit are fixed in position with respect to each other, in an arrangement such that air flow generated by the air-blowing unit is directed toward the irradiation unit.

3. The expansion device according to claim 2, further comprising:
    a reflection plate arranged above the irradiation unit,
    wherein the air-blowing unit is fixed above the irradiation unit and the reflection plate is positioned between the air-blowing unit and the irradiation unit.

4. The expansion device according to claim 1, wherein the control unit is configured to, after executing the distension process, control the irradiation unit to stop emitting light, and then, control the air-blowing unit to start blowing air.

5. The expansion device according to claim 4, wherein:
    the movement unit is configured to move the irradiation unit along the thermally-expandable sheet, and
    the control unit is configured to execute the distension process while moving the irradiation unit in a first direction by the movement unit, and is configured to control the air-blowing unit to blow air while moving the irradiation unit in a second direction opposite to the first direction by the movement unit.

6. The expansion device according to claim 4, wherein the control unit is configured to drive the ventilation unit while controlling the air-blowing unit to blow air such that outside air, supplied by the air-blowing unit, is ventilated inside the expansion device and is discharged to outside the expansion device by the ventilation unit.

7. The expansion device according to claim 1, wherein the control unit is configured to control the ventilation unit so as to stop or weaken ventilation by the ventilation unit while the irradiation unit emits light in the distension process.

8. The expansion device according to claim 1, wherein:
    the thermally-expandable sheet is distended by being heated to a prescribed temperature or higher in the distension process, and
    the control unit is configured to dry the thermally-expandable sheet by controlling the irradiation unit to emit light while relatively moving the thermally-expandable sheet and the irradiation unit by the movement unit such that the thermally-expandable sheet is maintained at a temperature lower than the prescribed temperature.

9. The expansion device according to claim 8, wherein the control unit is configured to, after drying the thermally-expandable sheet, control the irradiation unit to stop emitting light, and then, control the air-blowing unit to start blowing air.

10. The expansion device according to claim 1, wherein the control unit is configured to execute a preheating process of preliminarily heating the irradiation unit by causing the irradiation unit to emit light before executing the distension process, to lower a temperature of the irradiation unit to a preset temperature by controlling the irradiation unit to stop emitting light, and is configured to then control the air-blowing unit to start blowing air after executing the preheating process.

11. A three-dimensional image forming system comprising:
    the expansion device according to claim 1; and
    a printing device configured to print a light-to-heat conversion layer, which converts the light emitted from the irradiation unit into heat, on a front or back face of the thermally-expandable sheet,
    wherein the control unit is configured to execute the distension process to distend a portion of the thermally-expandable sheet on which the light-to-heat conversion layer is printed by causing the irradiation unit to emit light while relatively moving the thermally-expandable sheet on which the light-to-heat conversion layer is printed by the printing device and the irradiation unit.

12. The expansion device according to claim 1, wherein the control unit is configured to control the air-blowing unit and the ventilation unit to discharge the air inside the expansion device to the outside of the expansion device while the irradiation unit is controlled to not emit light.

13. The expansion device according to claim 1, wherein the movement unit moves the irradiation unit, and moves the air-blowing unit together with the irradiation unit.

14. An expansion device comprising:
    a lamp that emits light;
    a first fan whose arrangement position with respect to the lamp is fixed and which is arranged such that air flow from the first fan is directed toward the lamp, wherein the first fan is provided at a higher level in the expansion device than the lamp;
    a second fan configured to discharge air from inside the expansion device to outside the expansion device, wherein the second fan is provided at a lower level in the expansion device than the lamp; and a processor that controls the expansion device to:
  move the lamp relative to a thermally-expandable sheet and to irradiate the thermally-expandable sheet with the light of the lamp for a predetermined period; and
  start generating the air flow from the first fan after a lapse of the predetermined period.

15. The expansion device according to claim 14, wherein the processor further controls the expansion device to stop or weaken light emission from the lamp after the lapse of the predetermined period.

16. The expansion device according to claim 14, wherein the predetermined period is a period during which the thermally-expandable sheet is distended by causing the lamp to emit light while relatively moving the thermally-expandable sheet and the lamp or a period during which a front face of the thermally-expandable sheet is dried by emitting light to an extent that the thermally-expandable sheet is not distended while relatively moving the thermally-expandable sheet and the lamp.

17. An expansion device to expand at least part of a thermally-expandable sheet, the expansion device comprising:
  light-emitting means for emitting light to the thermally-expandable sheet;
  moving means for relatively moving the thermally-expandable sheet and the light-emitting means;
  air-blowing means for cooling the light-emitting means by blowing air to the light-emitting means; and
  control means for (i) executing a distension process to distend the thermally-expandable sheet by causing the light-emitting means to emit light while relatively moving the thermally-expandable sheet and the light-emitting means by the moving means, (ii) causing the air-blowing means to stop or weaking the blowing of the air to the light-emitting means while causing the light-emitting means to emit light in the distension process, and (iii) after executing the distension process, causing the light-emitting means to stop emitting light and then causing the air-blowing means to start blowing air.

18. The expansion device according to claim 17, wherein the moving means moves the light-emitting means along the thermally-expandable sheet, the control means executes the distension process while the light-emitting means is moved in a first direction by the moving means, and the control means causes the air-blowing means to blow air while the light-emitting means is moved in a second direction opposite to the first direction by the moving means.

* * * * *